United States Patent [19]

Iwasaki et al.

[11] Patent Number: 4,894,768
[45] Date of Patent: Jan. 16, 1990

[54] DATA PROCESSING SYSTEM WITH COPROCESSOR

[75] Inventors: Kazuhiko Iwasaki, Hachioji; Tsuneo Funabashi, Tokyo; Ikuya Kawasaki, Kodaira; Hideo Inayoshi, Kokubunji; Atsushi Hasegawa, Koganei; Takao Yaginuma, Hitachiota; Eiki Kondoh, Hitachi, all of Japan

[73] Assignees: Hitachi, Ltd.; Hitachi Microcomputer Engineering, Ltd., both of Tokyo; Hitachi Engineering Co., Ltd., Hitachi, all of Japan

[21] Appl. No.: 21,007

[22] Filed: Mar. 2, 1987

[30] Foreign Application Priority Data

Mar. 17, 1986 [JP] Japan .................. 61-56844

[51] Int. Cl.⁴ .................. G06F 13/00; G06F 15/16
[52] U.S. Cl. .................. 364/200; 364/228.6; 364/261.5
[58] Field of Search ........ 364/132, 138, 200 MS File, 364/900 MS File, 748, 200, 900

[56] References Cited

U.S. PATENT DOCUMENTS

| 4,270,167 | 5/1981 | Koehler et al. | 364/200 |
| 4,547,849 | 10/1985 | Louie et al. | 364/200 |
| 4,598,356 | 7/1986 | Dean et al. | 364/200 |
| 4,648,034 | 3/1987 | Heninger | 364/200 |
| 4,731,736 | 3/1988 | Mothersole et al. | 364/900 |
| 4,777,613 | 10/1988 | Shahan et al. | 364/200 X |

OTHER PUBLICATIONS

MC68020 32-Bit Microprocessor User's Manual, second edition, 1985, pp. 8-1 to 8-57 and pp. 9-26.

Primary Examiner—Gareth D. Shaw
Assistant Examiner—Paul Kulik
Attorney, Agent, or Firm—Antonelli, Terry & Wands

[57] ABSTRACT

When a microprocessor fetches an instruction to be processed by a coprocessor, it sends to the coprocessor a command corresponding to the instruction while informing the coprocessor that the bus cycle is in the mode of transfer of the instruction to the coprocessor. In transferring an operand from the memory to the coprocessor, the microprocessor asserts, in addition to a usual memory read signal, a signal ($\overline{CYCYCL}$) indicative of validity of the coprocessor and instructs the coprocessor to fetch data to thereby complete the operand transfer from memory to coprocessor within one bus cycle. In transferring data from the coprocessor to the memory, the microprocessor asserts, in addition to a usual memory write signal, the $\overline{CYCYCL}$ signal and instructs the coprocessor to deliver the data to thereby complete the data transfer from memory to coprocessor within one bus cycle. Thus, the signal transfer between memory and coprocessor can be completed within one bus cycle without resort to the provision of duplicate hardware in the coprocessor.

3 Claims, 26 Drawing Sheets

F I G. 5
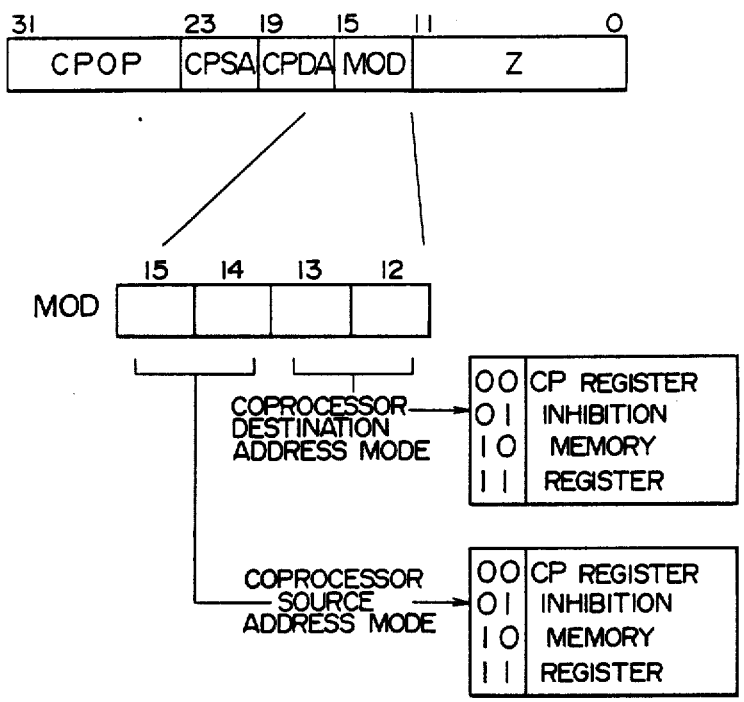
F I G. 6
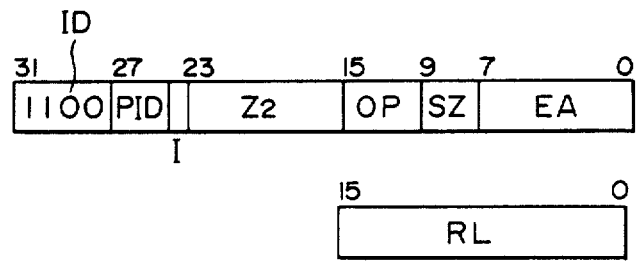

F I G. 12
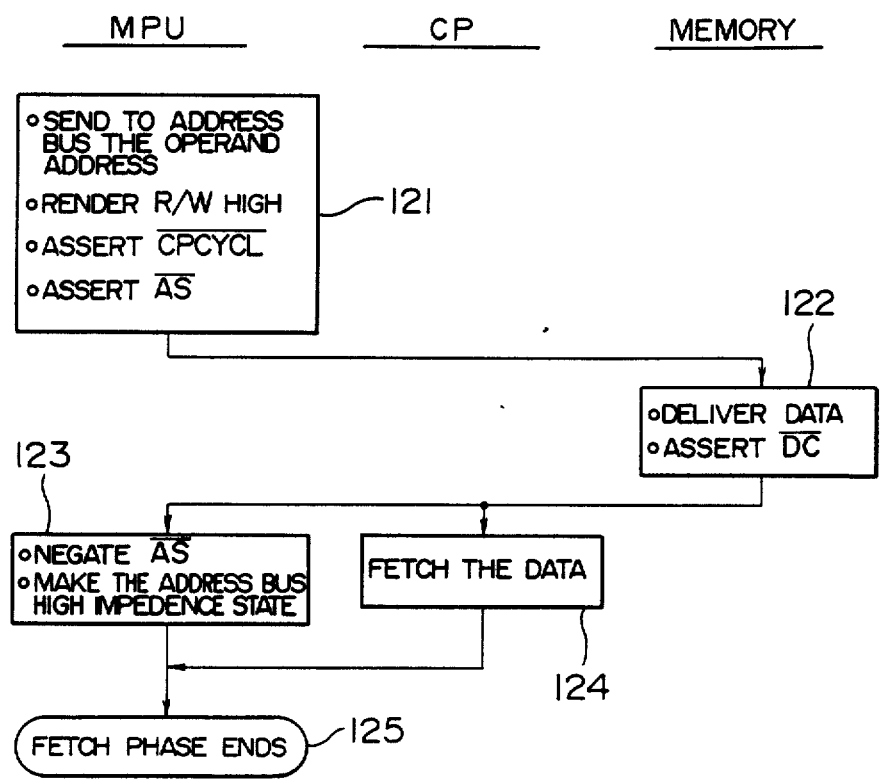

F I G. 17
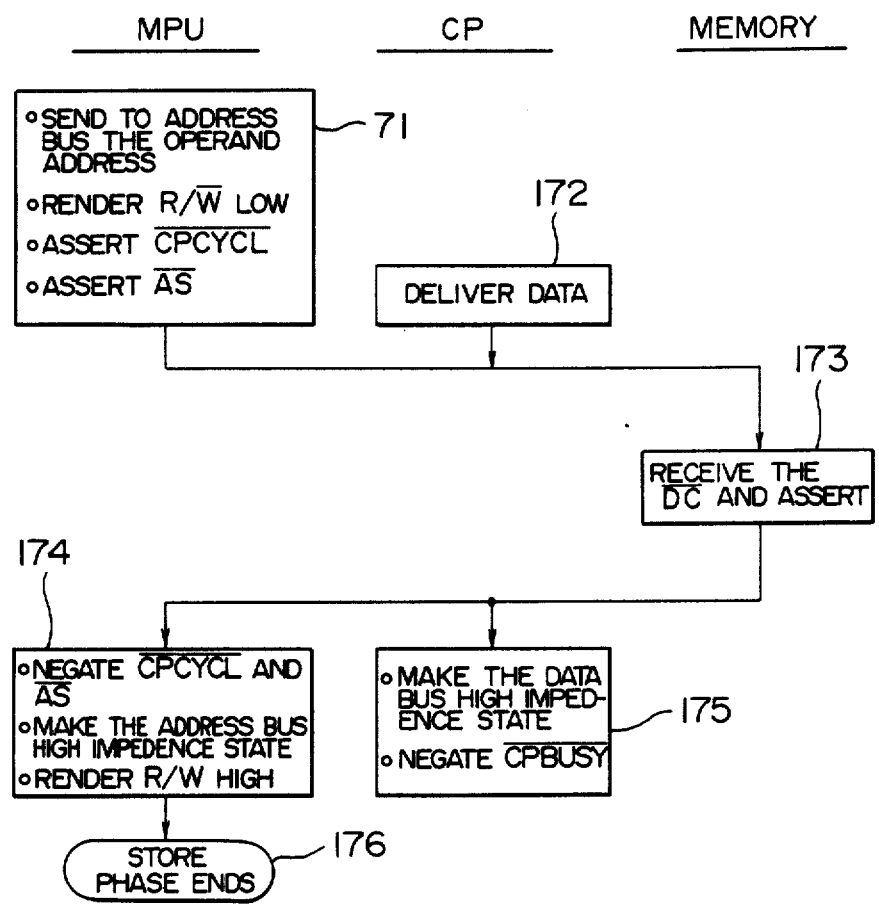

F I G. 20
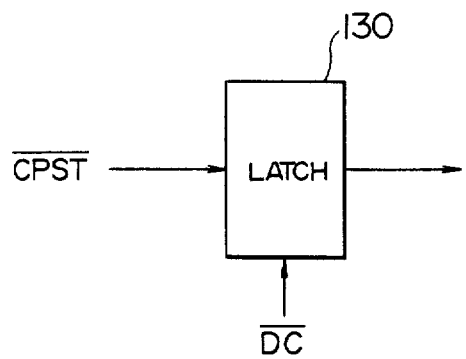
F I G. 21
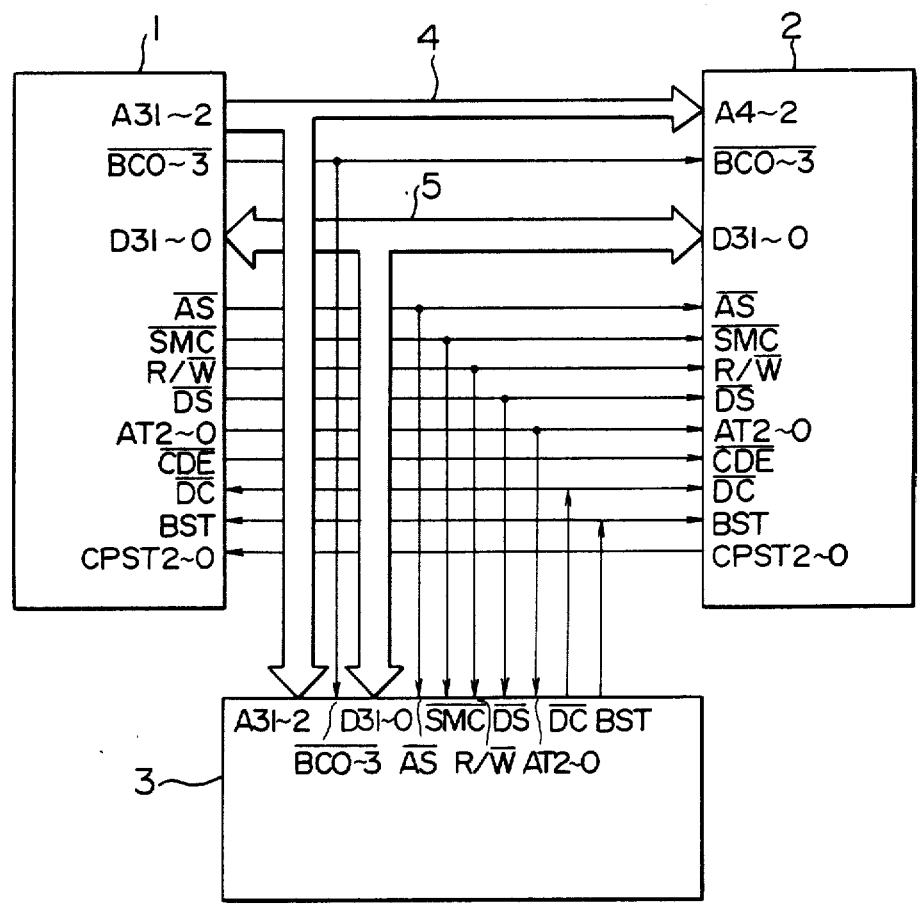

| | 1100 | OP | I | EA 1 | OP | SZ | EA 2 | |

| SZ | I = 1 | I = 0 |
|---|---|---|
| 0 0 | 8-BIT INTEGER | 32-BIT FLOATING POINT |
| 0 1 | 16-BIT INTEGER | 64-BIT FLOATING POINT |
| 1 0 | 32-BIT INTEGER | 80-BIT FLOATING POINT |
| 1 1 | 64-BIT INTEGER | B C D |

FPU COMMAND TRANSFER TIMING

F I G. 25
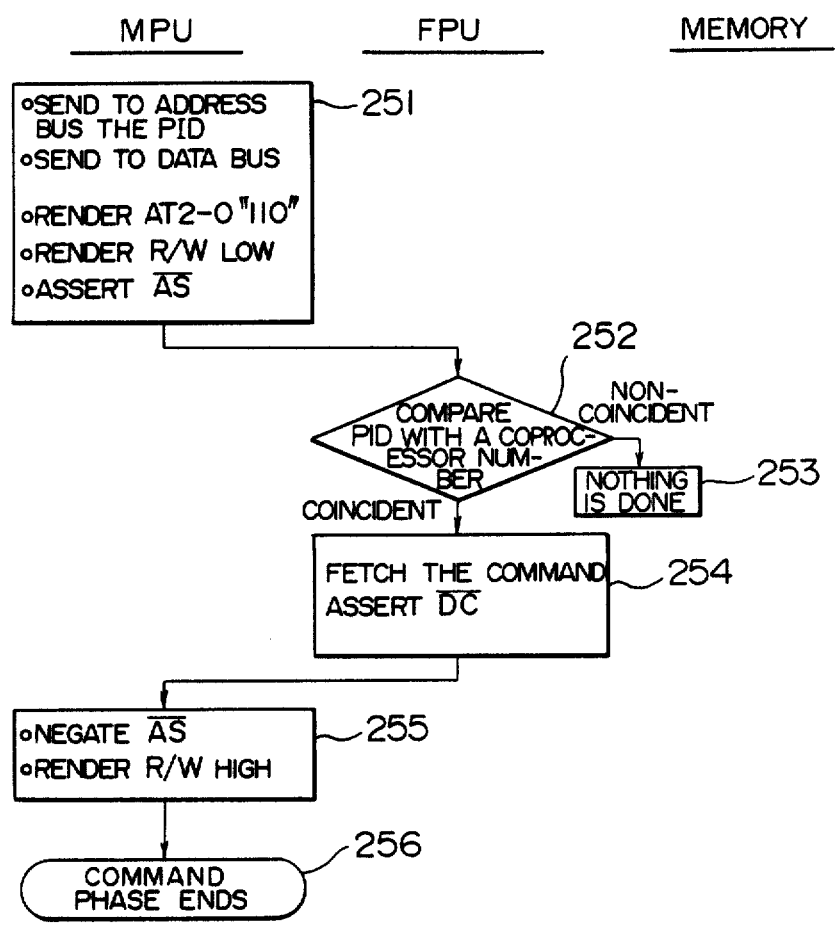

FPU EXECUTION SEQUENCE
FREG OP FREG → FREG

FPU EXECUTION SEQUENCE
FREG OP MEM → FREG

F I G. 28
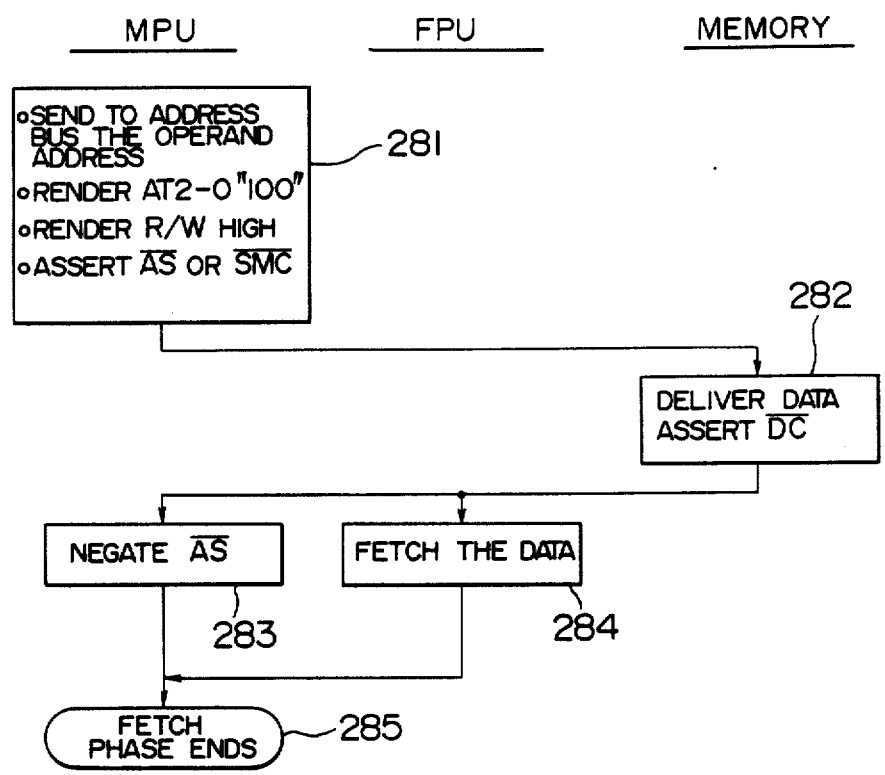

F I G. 32
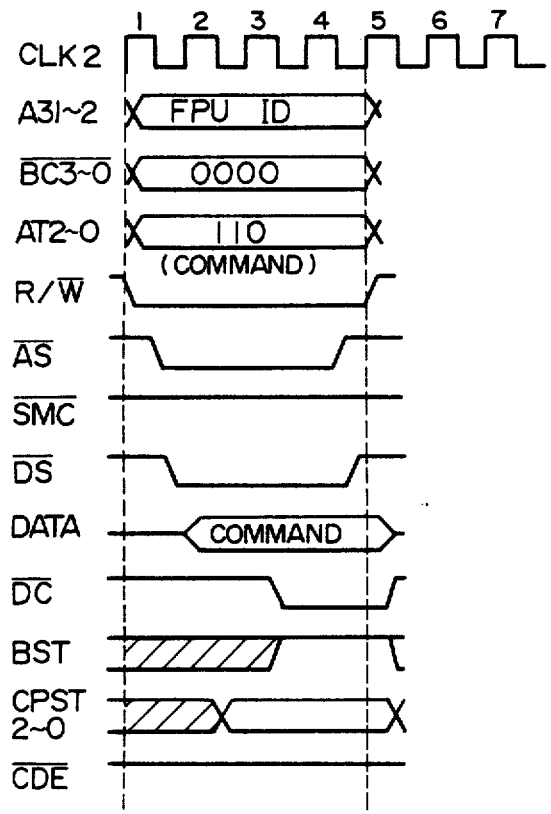

DATA PROCESSING SYSTEM WITH COPROCESSOR

BACKGROUND OF THE INVENTION

This invention relates to a data processing system having a microprocessor and coprocessors and more particularly to a data processing system suitable for closely coupled coprocessors (CP's) to a microprocessor (MPU).

A 16-bit or 32-bit microprocessor system is used in association with a coprocessor such as a floating point unit (FPU) to speed up numeric operations and so on. Accordingly, how to couple the CP to the MPU has been studied and some systems have been proposed.

In the past, three systems have been announced as referred to in the description of the prior art of JP-A-59-201154, which contemplates a fourth system as novel one. The first system, as explained in JP-A-59-201154, employs an Intel 8087 numeric data processor which monitors the instruction of an Intel 8086 processor to search for the instruction for a CP. To implement the first system, the CP requires an internal hardware arrangement which enables the CP to trace an instruction queue of an MPU. The second system, as disclosed in JP-A-59-201154, also needs the additional provision of internal hardware of a CP as in the case of the first system.

The third system, as disclosed in JP-59-201154, a CP for a National Semiconductor NS 16000, can eliminate the doubling of hardware is a slave unit to the MPU and data transfer between the CP and a memory is performed only through the MPU.

Finally, JP-A-59-201154 shows that the fourth system can eliminate the doubling of hardware and signals dedicated to a CP as well so that execution of instructions by the CP may be adjustable. But, as shown in FIGS. 14 and 15 of JP-A-59-201154, data transfer between the CP and a memory is again performed through a MPU.

When considering the operation speed of the conventional FPU, a Motorola MC 68881, for example, takes 5.8 μs (16.67 MHz) for multiplication of 64-bit floating point as described in the Motorola Semiconductor News No. 11 published in May, 1985. Therefore, overhead of the interface between MPU and FPU in the system of JP-A-59-201154 is not so large as to be incompatible with the operation speed and hence the interface between MPU and FPU of the above publication directed to general purposes may be considered meritorious.

Progressive advance in semiconductor technology however leads to realization of logical circuits such as multipliers with integrated circuits and there is a tendency toward improving the ability of the FPU to have an operation speed of about 180 ns even for 64-bit floating point multiplication as described in Digest of ISSCC, 1985, pp. 16–17.

When such a high-operation-speed FPU is incorporated in the system of the aforementioned publication, overhead of the interface becomes larger than the operation time and the effects of the high operation speed of the FPU are diluted, indicating that the system is insufficient for coupling with the high-operation-speed FPU.

Where the high-operation-speed FPU is incorporated into the first and second systems, the data transfer between FPU and memory can be performed within one bus cycle but the internal hardware of the CP not participating in operations essential to the FPU occupies the integration space, leaving behind insufficient space for a high-operation-speed FPU integration.

In the third and fourth coprocessor systems, on the other hand, because of the data transfer between FPU and memory performed through the MPU, two bus cycles are required and speed-up of the FPU is difficult to lead to improved performance of the entire system.

SUMMARY OF THE INVENTION

An object of this invention is to provide a data processing system capable of performing data transfer between CP and memory within one bus cycle and dispensing with any hardware not participating in functions essential to the CP, by using as output signals from a MPU (1) a coprocessor space signal $\overline{CPS}$ indicative of a coprocessor space and (2) a coprocessor cycle signal $\overline{CPCYCL}$ indicative of the validity of the data and as input signals to the MPU (1) a coprocessor busy signal CPBUSY indicating that the CP is busy and (2) a coprocessor status signal $\overline{CPST}$ indicating whether a condition of the CP is satisfied.

BRIEF DESCRIPTION OF THE DRAWINGS

FIG. 5 illustrates an example of format of a command from MPU to CP.

FIG. 6 exemplifies a coprocessor block transfer instruction format.

FIG. 12 is a flow chart of a fetch phase for implementing the FIG. 10 timing chart.

FIG. 17 is a flow chart of an execution phase for implementing the FIG. 16 timing chart.

FIG. 20 illustrates a flip-flop circuit necessary for implementing the FIG. 19 flow chart.

FIG. 21 is a block diagram showing the overall construction of a data processing system according to a second embodiment of the invention.

FIG. 25 is a flow chart of the command phase.

FIG. 28 is a flow chart of a fetch phase.

FIG. 32 is a timing chart of a conditional branch instruction.

DESCRIPTION OF THE PREFERRED EMBODIMENTS

A first embodiment of the invention will be described with reference to FIGS. 1 to 20 by taking an exemplary case in which one of the coprocessors is a numeric operation coprocessor.

Figure 1:
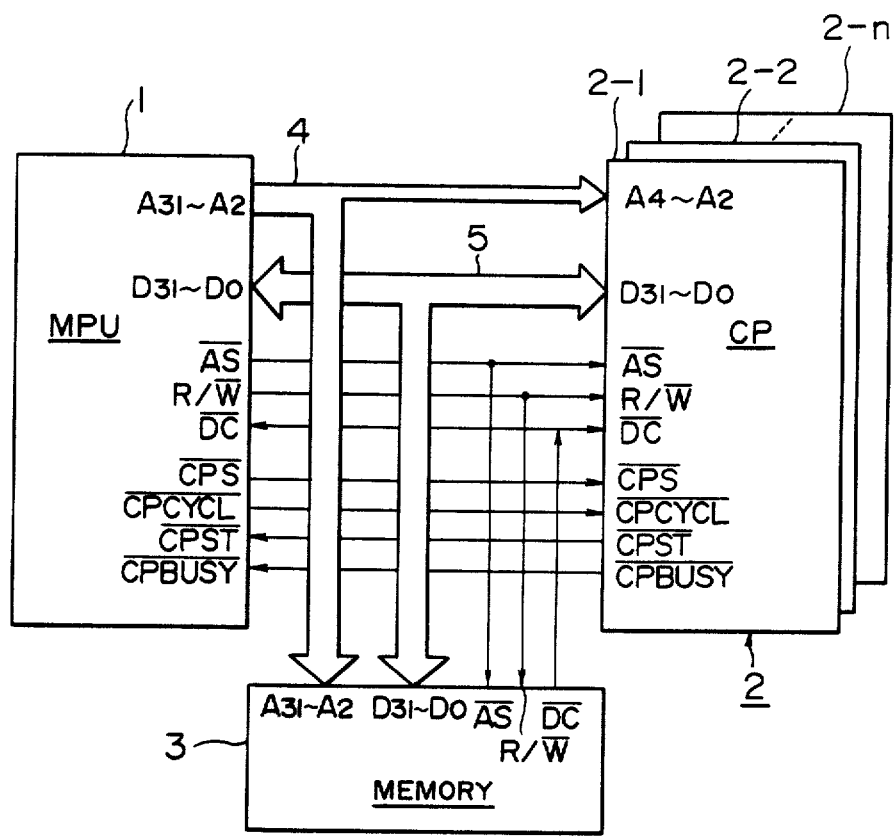
FIG. 1 is a block diagram showing the overall construction of a data processing system according to an embodiment of the invention.

Referring to FIG. 1, an MPU 1, a set of CP's generally designated by reference numeral 2 and a memory 3 are interconnected through an address bus 4, a data bus 5 and signal lines. There are provided n coprocessors 2-1, 2-2, ..., 2-n. Signals sent from the MPU 1 and received by the CP 2 are an address signal A4-2, a data signal D31-0, an address strobe signal $\overline{AS}$ and a read/write signal R/$\overline{W}$ which are commonly used in conventional system as well as a coprocessor space signal $\overline{CPS}$ and a coprocessor cycle signal $\overline{CPCYCL}$ which are not used in the conventional system.

Signals delivered out of the MPU 1 and received by the memory 3 are an address signal A31-2, the data signal D31-0, the address strobe signal $\overline{AS}$ and the read/write signal R/$\overline{W}$.

Signals delivered out of the coprocessor 2 and received by the MPU 1 are a data transfer complete signal $\overline{DC}$ and two signals, not used in a conventional system, which are a coprocessor status signal $\overline{CPST}$ and a coprocessor busy signal $\overline{CPBUSY}$.

A signal delivered out of the coprocessor 2 and received by the memory 3 is the data signal D31-0.

Signals sent from the memory 3 to the MPU 1 are the data signal D31-0 and the data transfer complete signal $\overline{DC}$.

Signals sent from the memory 3 to the coprocessor 2 are the data signal D31-0 and the data transfer complete signal $\overline{DC}$.

Signals necessary for the MPU and CP to cooperate for processing are listed in the following table. These signals will be specifically clarified as the description of the embodiment proceeds.

TABLE 1

| Abb. of Signal | Name of Signal/Description of Signal |
| --- | --- |
| A31~A2 | Address signal |
| A4~A2 | Address signal which is used for identification of a coprocessor. |

TABLE 1-continued

| Abb. of Signal | Name of Signal/Description of Signal |
| --- | --- |
| D31~D0 | Data signal |
| $\overline{AS}$ | Address Strobe which makes address on the address signals A31~A2 valid. |
| $\overline{DC}$ | Data transfer Complete which indicates that a bus cycle has been completed. In a coprocessor, it indicates that an out-out from a microprocessor is fetched at a command phase, data from a memory is inputted at a fetch phase and data to a memory is stored at a store phase. |
| $\overline{CPS}$ | Coprocessor Space which indicates that the present bus cycle is of the coprocessor operation. |
| $\overline{CPCYCL}$ | Coprocessor Cycle which indicates that the present bus cycle is of the data transfer for the coprocessor. |
| $\overline{CPST}$ | Coprocessor Status which indicates that a condition of the coprocessor is satisfied. |
| $\overline{CPBUSY}$ | Coprocessor Busy which indicates that the coprocessor is under a memory accessing or an operation executing. |
| R/$\overline{W}$ | Read/$\overline{Write}$ which indicates that the present bus cycle is of read/write cycle. |
| iOE | i O End which indicates that an input or output operation is finished. |
| CMR | Command phase Request which indicates that a coprocessor is requested to fetch a command from a microprocessor. |
| MRR | Memory Read Request which indicates that a coprocessor is requested to read out data from a memory. |
| MWR | Memory Write Request which indicates that a coprocessor is requested to write data to a memory. |
| EXEC | Execution which indicates that an operation instructed by and instruction is being executed. |

When the MPU fetches an instruction to be processed by the CP in the course of processing a program, it sends to the CP a command for CP corresponding to that instruction. Instructions and commands involved will be exemplified hereinafter by using codes or fields as below.

| Abb. of Code or Field | Name of Code or Field |
| --- | --- |
| OP | Operation code or field |
| PID | Processor Identification code or field |
| SZ | Size code or field |
| BCD | Binary Coded Decimal |
| EA | Effective Address code or field |
| CPOP | Coprocessor Operation code or field |
| CPSA | Coprocessor Source Address code or field |
| CPDA | Coprocessor Destination Address code or field |
| MOD | Address Mode code or field |
| COND | Condition code or field |
| LG | Length code or field |
| DISP | Displacement code or field |
| SA | Source Address code or field |
| DA | Destination Address code or field |

Instruction for a Mathematical Operation

Figure 2:
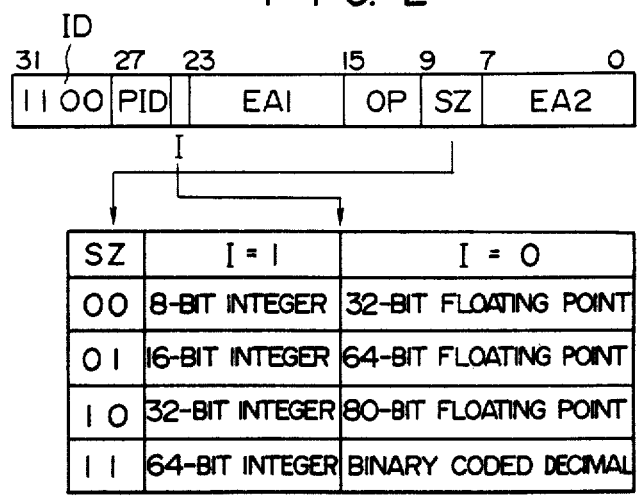
FIG. 2 illustrates an example of format of a coprocessor operation instruction.

The instruction format therefor is shown in FIG. 2. A 4-bit head ID of the instruction being "1100" indicates that the instruction is related to the CP.

This instruction format is adapted to execute an operation OP for an operand of effective address EA1 and an operand of effective address EA2 and to store an operation result in a register stack or memory of the CP. A processor identification PID of 3 bits indicates a CP number 2-1, 2-2, ... or 2-8 and a designated CP is caused to execute the instruction. Eight CP's are simultaneously connectable. A bit I indicates whether the operand is of integer or of non-integer. Specifically, for I=1, integer 8 bits, 16 bits, 32 bits and 64 bits are respectively indicated by values of size bit SZ being "00", "01", "10" and "11". For I=0, floating points of 32 bits, 64 bits and 80 bits and binary coded decimal (BCD) ddata are respectively indicated by the size bit values "00", "01", "10" and "11". The CP converts the integer bits into the floating point bits prior to operations. The reference characters EA1 and EA2 are respectively indicative of effective addresses of a source operand and a destination operand. When register direct addressing is designated for the effective addresses EA1 and EA2, these effective addresses designate the registers of the CP. An operation field OP indicates operations such as addition and multiplication. The size bit SZ indicates the size of data as described previously. The bit size for internal operations is independent of the size bit SZ and in the case of floating point, the internal operations are executed with 80 bits.

Figure 3:
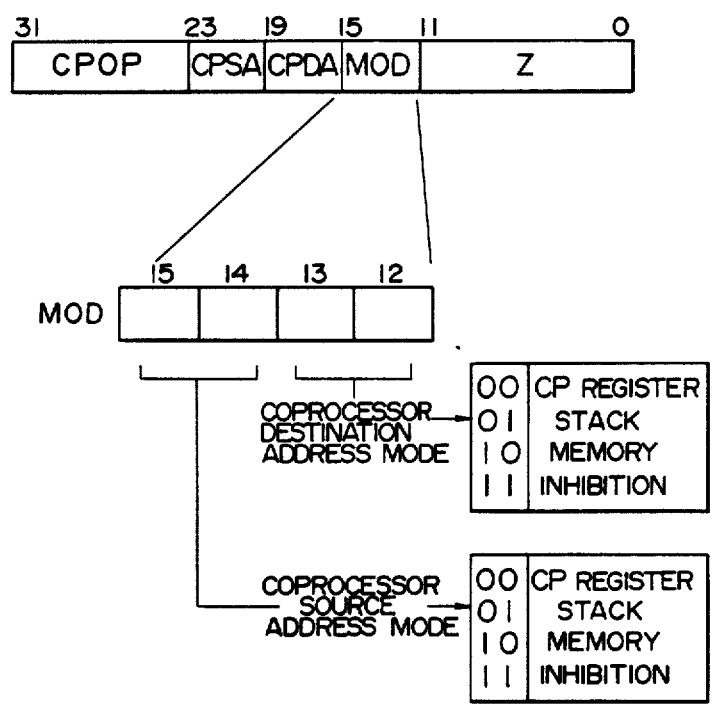
FIG. 3 illustrates an example of format of a command from MPU to CP.

Command to the Coprocessor from the Microprocessor in Order to Execute a Mathematical Operation The command format therefor is shown in FIG. 3. Eight bits are allotted to a CP operation CPOP. Coprocessor source address CPSA and coprocessor destination address CPDA are each of a 4-bit length. A 4-bit field MOD indicative of address format details the coprocessor source address CPSA and coprocessor destination address CPDA. More particularly, when bits 15 and 14 of the field MOD indicate "00", the coprocessor source operand is identified as a register of the CP, when the two bits indicate "01", the coprocessor source operand is identified as a stack of the CP, and when these bits indicate "10", the coprocessor source operand is identified as an external memory. The bits 15 and 14 of "11" indicate inhibition. The CPSA of FIG. 3 is valid only when the bits 15 and 14 indicate "00". Similarly, the coprocessor destination operand is identified as a register of the CP designated by the CPDA when bits 13 and 12 of the field MOD indicate "00", identified as a stack when the two bits indicate "01" and identified as the memory when these bits indicate "10". The bits 13 and 12 of "11" indicate inhibition. When the stack is designated as the coprocessor source address CPSA, 1(one) is added to the stack pointer of the CP and when the stack is designated as the coprocessor destination address CPDA, 1(one) is subtracted from the stack pointer. Bits 11 to 0 generally designated by Z are all zero.

Figure 4:
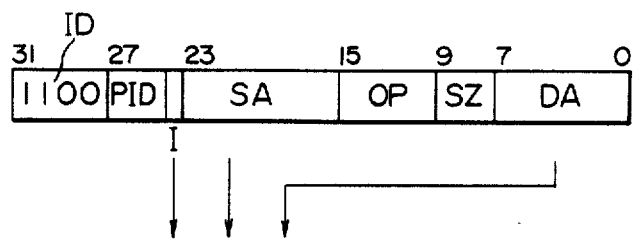
FIG. 4 illustrates an example of format of a coprocessor transfers instruction.

Instruction (CPMOVE) for Data Transfer between a Register of the Coprocessor and the Memory The instruction format therefor is shown in FIG. 4. In this instruction, bit I, source operand and destination operand as well as the relation between actually selected operands are the same as those of the FIG. 2 format. Unless register direct addressing is designated for source address SA and destination address DA, each field of FIG. 4 has the same meaning as that of each field of FIG. 2.

Specifically, in order to permit transfer of an integer of a register in the MPU and of a floating point of a register in the CP, when I=1 (integer) under an instruction CPMOVE for transferring data to a register CPR of the CP (instruction CPMOVE to CPR in FIG. 4), a register R of the MPU can be designated by the source operand. When I=0 (floating point) under an instruction CPMOVE for transferring data from the CP register CPR (instruction CPMOVE from CPR in FIG. 4), the MPU register R is permitted to be designated as the destination operand. Either of data transfer is performed in terms of integer and the CP converts integer into floating point.

In the other combinations, the CP register CPR is selected when register direct addressing is designated.

For example, where the memory M is designated as the source operand and the MPU register R is designated as the destination operand when I=0 (floating point format) under the instruction CPMOVE to CPR, floating point data are transferred from memory M to CP register CPR.

The MPU register R is inhibited from being designated as both the source operand and destination operand when I=0 (floating point) under the instruction CPMOVE from CPR.

Command to the Coprocessor from the Microprocessor in Order to Execute Data Transfer under Instruction CPMOVE The command format therefor is shown in FIG. 5. This format is identical to the FIG. 3 format, excepting encoding of a field MOD. Specifically, the CP register is designated with "00" of bits 15 and 14 or bits 13 and 12, inhibition is designated with "01" of these bits, the memory is designated with "10" and the MPU register is designated with "11". When the MPU register is designated, the CP converts integer into floating point.

Instruction (CPMOVM) for Data Transfer between a Plurality of Registers of the Coprocessor and the Memory The instruction format therefore is shown in FIG. 6. This instruction has a 6-byte length. A 4-bit head is indicative of a coprocessor instruction and the following 3 bits are used to designate a coprocessor number 2-1, 2-2, ... or 2-8. Like the format of FIG. 2, bit I and field SZ indicate the kind of data. A field OP identifies this instruction CPMOVM and a field EA indicates an effective address of destination operand. As far as the above fields are concerned, this instruction resembles the formats of FIGS. 2 and 4. The source operand of the instruction CPMOVM is fixed in the register of the CP and therefore bits of the second byte $Z_2$ are all zero. In order to designate one of the plurality of registers of the CP which is expected to transfer its data, the instruction CPMOVM has a register list in the fifth and sixth bytes. Each bit in the register list corresponds to each register and a register transfers its data when the corresponding bit is set to "1" but does not transfer its data when the corresponding bit is set to "0".

Figure 7:
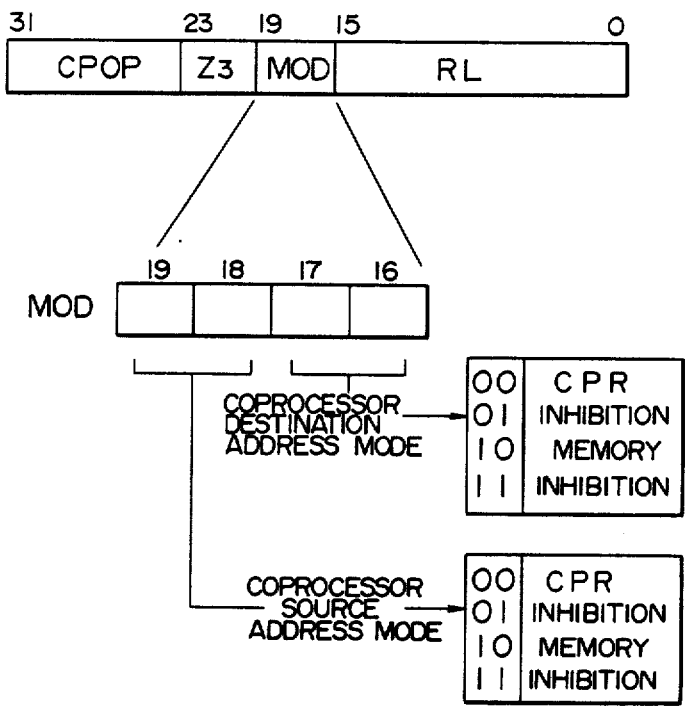
FIG. 7 illustrates an example of format of a command from MPU to CP.

Command to the Coprocessor from the Microprocessor in Order to Execute Data Transfer under Instruction CPMOVM The command format therefore is shown in FIG. 7. Bits 20 to 23, generally designated by $Z_3$, are all zero. The instruction CPMOVM is placed in the mode for data transfer from CPR to memory when bits 19, 18, 17 and 16 of a field MOD indicative of address mode indicate "0010", is placed in the mode for data transfer from memory to CPR when these bits indicate "1000", and is inhibited when these bits take the other patterns.

Instruction (CPB$_{cc}$) for Branch for the Coprocessor

Figure 8:
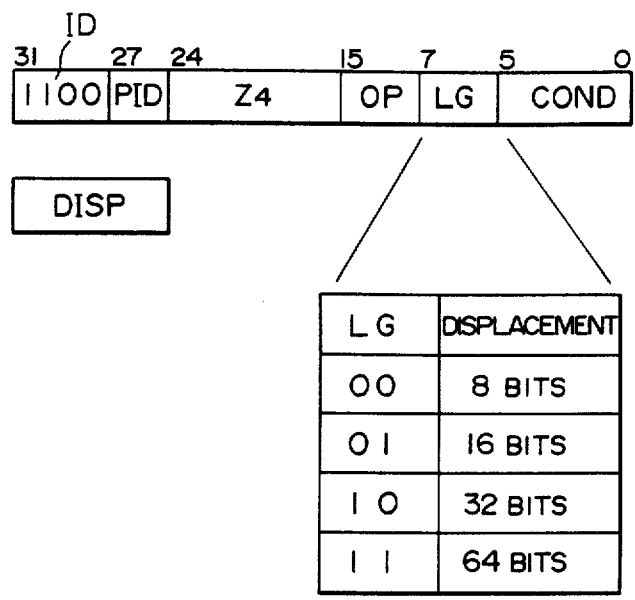
FIG. 8 exemplifies a coprocessor conditional branch instruction format.

The instruction format therefore is shown in FIG. 8. This instruction is for branch which depends on whether a condition of the CP is satisfied. Bits 24 to 16, generally designated by $Z_4$, are all zero. A displacement length LG indicates the size of displacement DISP and is used as shown in FIG. 8 to select 8-bit, 16-bit, 32-bit or 64-bit size. The condition for branch is indicated by a field COND.

Figure 9:
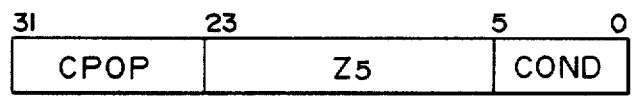
FIG. 9 illustrates an example of format of a command from MPU to CP.

Command to the Coprocessor from the Microprocessor in Order to Execute the Branch under Instruction CPB$_{cc}$ The command format therefore is shown in FIG. 9. A condition field COND is designated by lower six bits. Bits 5 to 23, generally designated by $Z_5$, are all zero.

Figure 10:
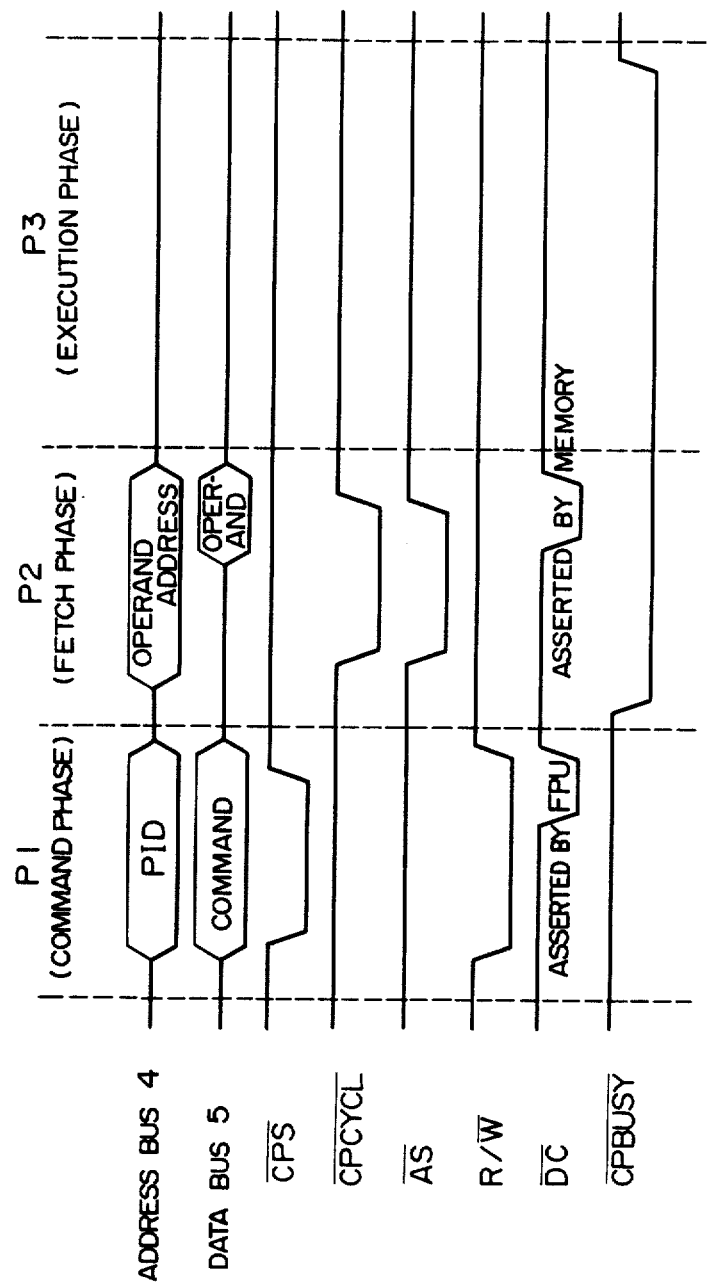
FIG. 10 is a timing chart of execution of the coprocessor operation instruction.

The instruction execution is carried out in accordance with the afore-mentioned instructions and commands as will be described below. FIG. 10 shows an example of a bus operation for execution of an arithmetic operation/fundamental function instruction. As diagrammatically shown in FIG. 10, the execution is divided into three phases, i.e., command phase p 1, fetch phase p 2 and execution phase p 3.

Figure 11:
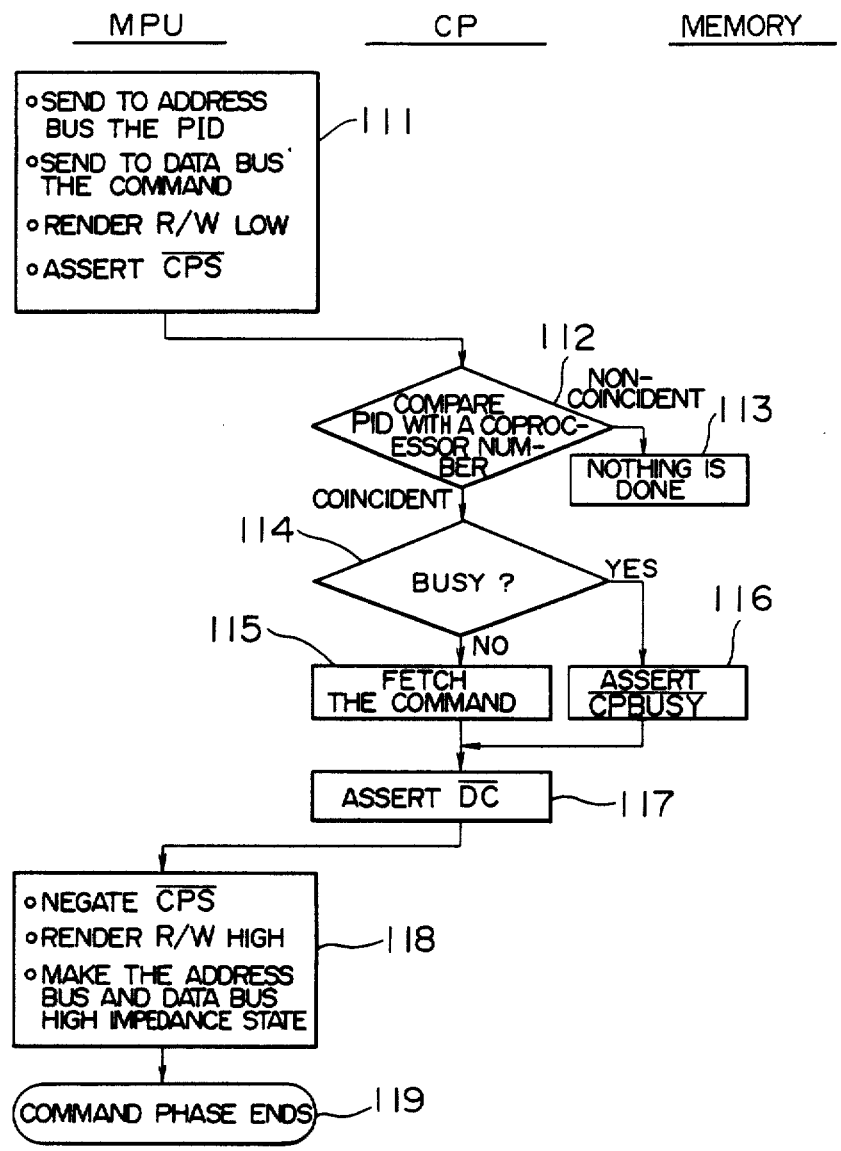
FIG. 11 is a flow chart of a command phase for implementing the FIG. 10 timing chart.

During the command phase, a predetermined CP is selected and commands necessary for execution are given. The command phase proceeds in accordance with a flow chart as illustrated in FIG. 11. Referring to FIG. 11, the MPU sends a coprocessor number (identification) PID onto the address bus and a command for the CP onto the data bus, renders the R/$\overline{W}$ signal low and thereafter asserts the signal $\overline{CPS}$ to indicate the command phase (step 111). Then, the MPU waits for assertion of the signal $\overline{DC}$ by the CP. When the $\overline{DC}$ is asserted, the MPU changes the address bus 4, $\overline{CPS}$ and R/$\overline{W}$ as can be seen from FIG. 10. Upon receipt of the low level $\overline{CPS}$, the CP compares a coprocessor number of its own with the coprocessor number PID on the address bus (step 112). If non-coincident, nothing is executed (step 113). If coincident, the CP knows that it is selected and fetches command or data bus 5 and asserts the $\overline{DC}$ (steps 115 and 117) if not busy (step 114). If busy, the CP asserts the $\overline{CPBUSY}$ and then asserts the $\overline{DC}$ (steps 116 and 117). When detecting that the CP has asserted the $\overline{DC}$, the MPU negates the $\overline{CPS}$ and then renders the R/$\overline{W}$ high and makes the address bus 4 and data bus 5 high impedance state (step 118), thus ending the command phase (step 119).

During the fetch phase, data necessary for the CP are fetched from the memory. A flow chart of the fetch phase is exemplified in FIG. 12. The MPU sends an operand address onto the address bus, renders the R/$\overline{W}$ signal high and asserts the $\overline{CPCYCL}$, thereby informing the CP of the data transfer cycle. At the same time, the MPU asserts the $\overline{AS}$ and waits for assertion of the $\overline{DC}$ signal by the memory (step 121).

When the $\overline{DC}$ is asserted, the MPU changes the address bus, $\overline{CPCYCL}$ and $\overline{AS}$ as will be seen from FIG. 10. As in the case of the conventional microcomputer system, the memory delivers to the data bus the content stored at an address designated by the address bus and asserts the $\overline{DC}$ signal (step 122). When detecting assertion of the $\overline{DC}$ by the memory, the MPU negates the $\overline{AS}$ and makes the address bus 4 high impedance state (step 123). The CP, when detecting assertion of the $\overline{DC}$ by the memory, fetches data on the data bus into the CP (step 124). Then both the MPU and CP detect low level of the $\overline{DC}$ signal, the operand fetch ends (step 125).

Where 64-bit floating point data are to be transferred from memory to CP through the 32-bit bus, the fetch phase of FIG. 10 repeats itself twice. In this case, the sequence of FIG. 12 is repeated twice under microprogram control of the MPU.

After receiving the necessary operand, the CP performs operations such as arithmetic operation and fundamental function operation in accordance with a program stored in the CP per se. This phase is termed the execution phase. As a predetermined operation ends, the CP negates the $\overline{CPBUSY}$ and informs the MPU of completion of th operation.

Either of the MPU and CP implements the FIG. 10 timing chart and the flow charts of FIGS. 11 and 12 by using a logical circuit as exemplified below.

Figure 13:
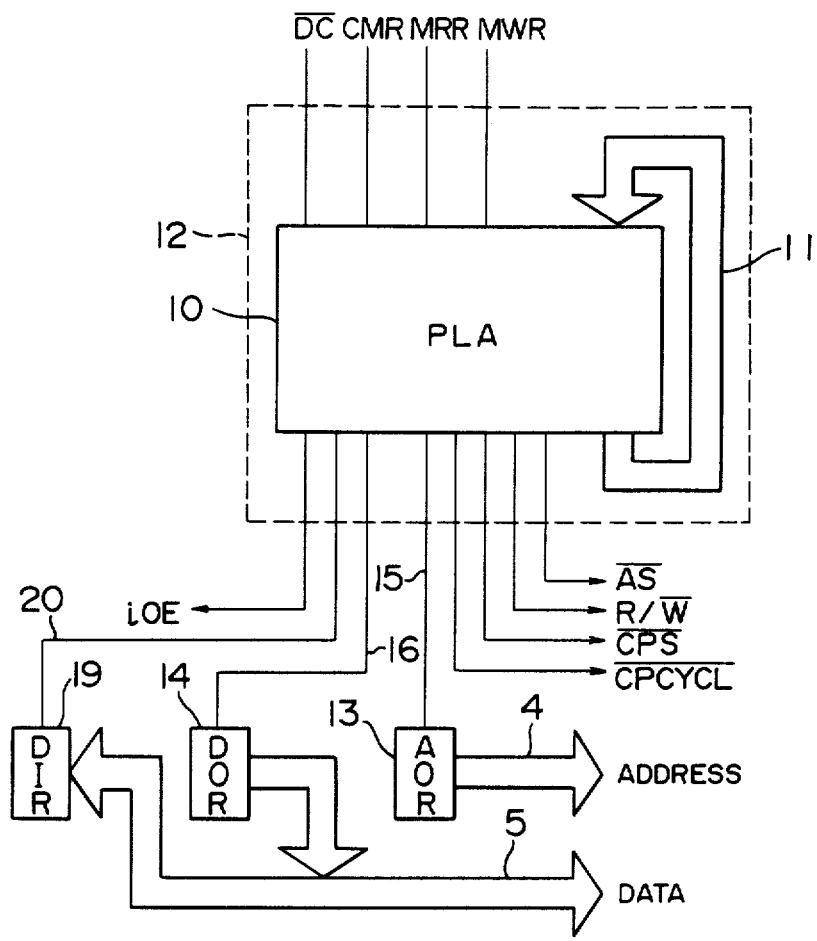
FIG. 13 is a block diagram showing an example of an input/output circuit of the MPU used for implementing the FIG. 10 timing chart.

Referring to FIG. 13, there is illustrated an example of an input/output control circuit of the MPU. Principally, this circuit has a state machine 12 comprised of a programmable logic array (PLA) 10 and a feedback bus 11. When the MPU detects an instruction as shown in FIG. 2, 4, 6 or 8 which is to be processed by the CP, its internal microprogram (not shown) causes the MPU to set the coprocessor number PID into an address output register (AOR) 13 and to set the command as shown in FIGS. 3, 5, 7 or 9 into a data output register (DOR) 14 in accordance with the content of the operation OP. Subsequently, in accordance with the microprogram, the MPU asserts a command phase request CMR. When the CMR is asserted, the state machine renders the R/$\overline{W}$ low. At the same time, the state machine asserts control lines 15 and 16 to send the coprocessor number PID to the address bus 4 and the command as shown in FIG. 3, 5, 7 or 9 to the data bus 5. Then, the state machine asserts the $\overline{CPS}$ and waits for the $\overline{DC}$ signal being asserted by the CP. When the $\overline{DC}$ signal is asserted, the state machine 12 renders the R/$\overline{W}$ high, negates the control lines 15 and 16 to make the address bus 4 and data bus 5 high impedance state and asserts an iO END (iOE) to inform the microprogram of the MPU of completion of the input/output cycle.

Upon receipt of the iOE from the state machine 12, the microprogram of the MPU sets an address of operand of the instruction shown in FIGS. 2, 4, 6 or 8 into the AOR 13, asserts a memory read request MRR and triggers the state machine 12 to shift it to the fetch phase. When the MRR is asserted, the state machine 12 asserts the control line 15 to send the operand address to the address bus 4, renders the R/$\overline{W}$ high and asserts the $\overline{AS}$. Thereafter, the state machine 12 asserts the $\overline{CPCYCL}$ and waits for the $\overline{DC}$ being asserted by the CP. When the $\overline{DC}$ is asserted, the operand fetch ends, sending the iOE to the microprogram of the MPU and shifting to the execution phase.

Figure 14:
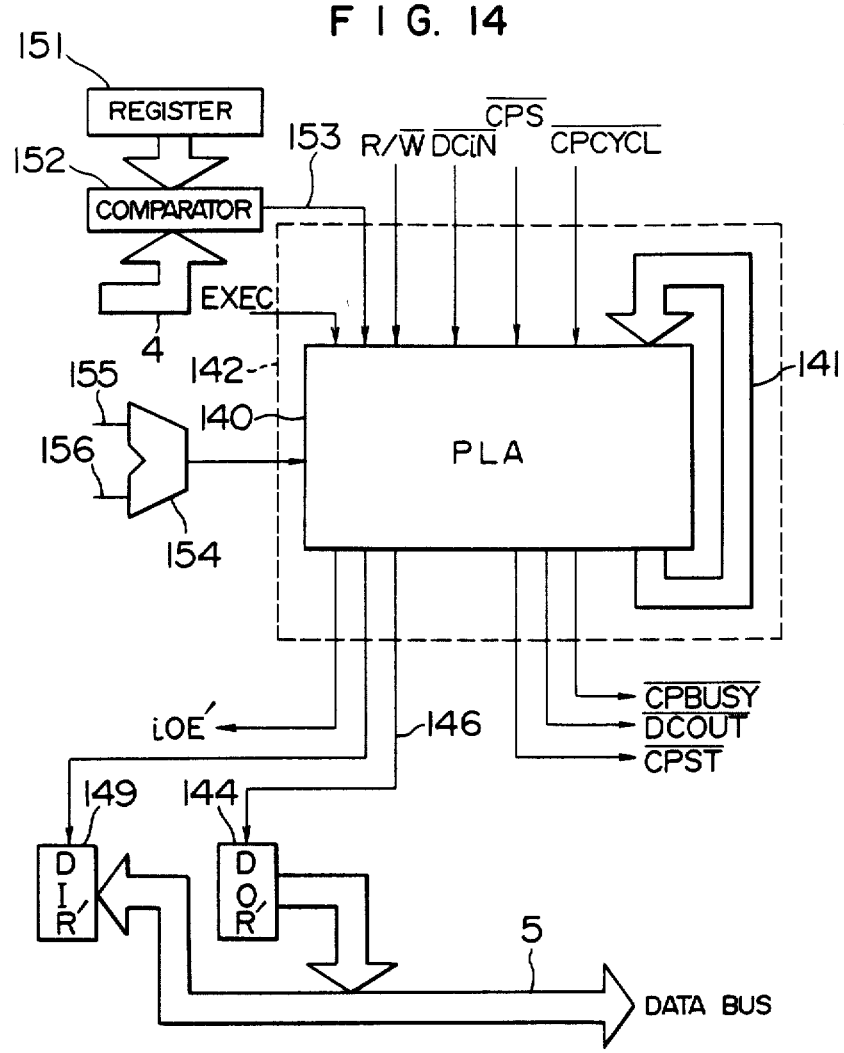
FIG. 14 is a block diagram showing an input/output circuit of the CP used for implementing the FIG. 10 timing chart.

In the CP, an input/output control circuit as exemplified in FIG. 14 is used for the command phase, fetch phase and execution phase. The logical circuit of FIG. 14 has a state machine 142 comprised of a programmable logic array (PLA) 140 and a feedback bus 141.

During the command phase, the $\overline{CPS}$ signal is asserted and the R/$\overline{W}$ is low. The coprocessor identification PID inputted through the address bus 4 is compared with a signal from a coprocessor number register 151 of the CP at a comparator 152, and a comparison result is supplied to the state machine 142 through a signal line 153. When the input coprocessor number PID does not coincide with the signal of the coprocessor number register 151 and hence the signal line 153 is at low level, the state machine 142 is held in the current state. When the input coprocessor identification PID coincides with the signal of the coprocessor number register 151 and so the signal line 153 is at high level, the state machine 142, if not busy, fetches the command into a data input register DIR' 149, asserts the $\overline{\text{DCOUT}}$ and renders a $\overline{\text{DC}}$ pin for the CP low. Concurrently, the state machine 142 asserts the iOE' to inform the microprogram of the CP (not shown) that the input/output cycle has been completed. The command fetched in the data input register DIR' 149 is transferred to a predetermined register not shown. When the signal line 153 is high and the state machine 142 is busy, the state machine 142 asserts the $\overline{\text{CPBUSY}}$ and $\overline{\text{DCOUT}}$, disabling data fetch into the DIR' and assertion of the iOE'. Since the $\overline{\text{DC}}$ is an input/output signal as viewed from the CP, the $\overline{\text{DC}}$ input and $\overline{\text{DC}}$ output are represented by $\overline{\text{DCiN}}$ and $\overline{\text{DCOUT}}$, respectively.

During the fetch phase, the MPU asserts the $\overline{\text{CPCYCL}}$. The R/$\overline{\text{W}}$ is high, indicating memory read. When the $\overline{\text{DCiN}}$ from the memory is asserted, the state machine 142 fetches a value of the data bus 5 into the DIR' 149 and asserts the iOE' to inform the microprogram of the CP that the input/output cycle has been completed. During the fetch phase, the $\overline{\text{CPBUSY}}$ remains asserted.

During the execution phase, an operation is executed by the fetched command and operand and the microprogram of the CP asserts that an execution signal EXEC indicative of an operation in execution is inputted. An operation result of an operation unit 154 is supplied to the state machine 142 and as will be described later, the $\overline{\text{CPST}}$ signal is generated. When the operation is finished and so the microprogram of the CP negates the signal EXEC, the state machine 142 negates the $\overline{\text{CPBUSY}}$, announcing completion of the CP execution.

Data transfer to be performed during a store phase will be described later.

The MPU can detect the completion of the CP execution phase by way of the $\overline{\text{CPBUSY}}$ signal. Accordingly, the MPU detects the completion of the execution phase by microprogram to shift to execution of the next instruction. Incidentally, the execution phase sometimes requires several of tens to several of hundreds of cycles and it is not always profitable from the standpoint of performance for the MPU to continue waiting for the CP execution being finished.

Thus, a status register SR of the MPU has a wait bit W which determines whether the MPU should wait for the CP execution being finished before it executes the next instruction. In addition to the wait bit W, the status register SR has a bit T representative of trace mode and flags N, Z, V and C representing negative, zero, overflow and carry of the operation result, respectively.

Figure 15:
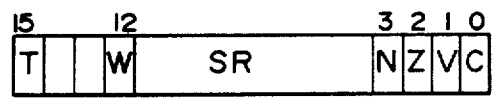
FIG. 15 illustrates an example of a status register.

FIG. 15 illustrates an example of the status register SR. For the bit W being "1", the MPU executes the next instruction after detecting the $\overline{\text{CPBUSY}}$ signal being negated. For the bit W of "0", the MPU shifts to execution of the next instruction irrespective of the $\overline{\text{CPBUSY}}$ signal. As an alternative, the OP field of instruction, for example, may be allotted with a wait bit to determine, at every instruction, whether the MPU should wait for the CP execution being finished.

Figure 16B:
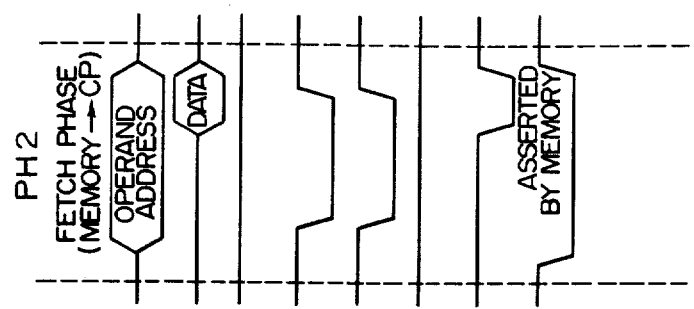
FIGS. 16a and 16b are timing charts of execution of the coprocessor transfer instruction.
Figure 16A:
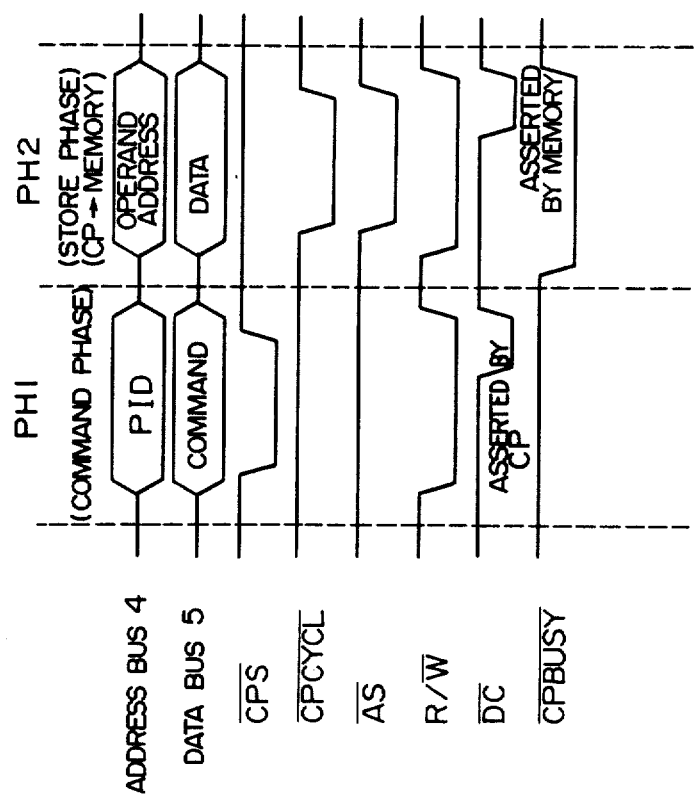

FIG. 16 illustrates a bus operation for data transfer between the CP register CPR and the memory. The bus operation consists of command phase PH 1 and store phase PH 2. Timing chart and flow chart for the command phase PH 1 are identical to the FIG. 10 timing chart and FIG. 11 flow chart, respectively. In FIG. 16a, a timing chart during data transfer from CP register CPR to memory is illustrated and a timing chart during data transfer from memory to CP register CPR is illustrated in FIG. 16b. A number representative of the register CPR involved in data transfer is determined by the command from the MPU during the command phase.

FIG. 17 shows a flow chart corresponding to the store phase in FIG. 16a. The MPU sends to the address bus an operand address, renders the R/$\overline{\text{W}}$ low and asserts the $\overline{\text{CPCYCL}}$, thus requesting data transfer. Simultaneously, the MPU asserts the $\overline{\text{AS}}$ for writing the memory (step 171).

The CP knows the kind of command and the register number during the command phase and therefore, as soon as the MPU has asserted the $\overline{\text{CPCYCL}}$, the CP delivers to the data bus the content of register to be transferred (step 172). As in the case of the conventional microcomputer system, the memory is accessed with the address on the address bus when the $\overline{\text{AS}}$ is asserted, thereby asserting the $\overline{\text{DC}}$ (step 173). When detecting assertion of the $\overline{\text{DC}}$ by the memory, the MPU ends execution of the instruction (step 174) and the CP, when detecting low level of the $\overline{\text{DC}}$, negates the $\overline{\text{CPBUSY}}$ to end the instruction (steps 175 and 176).

The flow chart of FIG. 17 is controlled by the circuits of FIGS. 13 and 14.

The MPU sequence will be first described with reference to FIG. 13. In accordance with the microprogram of the MPU, the operand address is set into the AOR 13 and a memory write request MWR is asserted. When the MWR is asserted, the state machine 12 renders the R/$\overline{\text{W}}$ low, asserts the $\overline{\text{CPCYCL}}$ and $\overline{\text{AS}}$, and waits for the $\overline{\text{DC}}$ being asserted the memory. When detecting assertion of the $\overline{\text{DC}}$ by the memory, the state machine 12 asserts the iOE and informs the MPU microprogram of completion of the stor phase.

Next, the CP operation in accordance with the FIG. 17 flow chart will be described with reference to FIG. 14. During the command phase PH 1, transfer data corresponding to the command is transferred to a data output register (DOR') 144 in accordance with the CP microprogram. When the R/$\overline{\text{W}}$ is rendered low and the $\overline{\text{CPCYCL}}$ is asserted, indicating writing memory, the state machine 142 asserts a control line 146 and sends the content of the DOR' 144 to the data bus 5. As in the case of the conventional microcomputer system, when memory accessing is finished and the memory asserts the $\overline{\text{DC}}$, the state machine 142 negates the control line 146, makes the data bus 5 high impedance state and asserts the iOE' to inform the CP microprogram of completion of the input/output operation.

As is clear from the above, the sequence in FIG. 16a can be implemented by the circuits of FIGS. 13 and 14.

Illustrated in FIG. 16b is a timing chart of execution phase of a bus operation for data transfer from memory to CP register. The command phase therefor is the same as that shown in FIG. 16a and is not illustrated. In the timing chart for data transfer from memory to CP register illustrated in FIG. 16b, the fetch phase is the same as that of the FIG. 10 timing chart with the only exception that the operand on the data bus 5 is replaced with data, and a flow chart corresponding to the timing chart in FIG. 16b resembles the FIG. 12 flow chart. Accordingly, the MPU and CP can be controlled for data transfer by means of the input/output control circuits of FIGS. 13 and 14 in accordance with the same sequence as that described previously.

Figure 18:
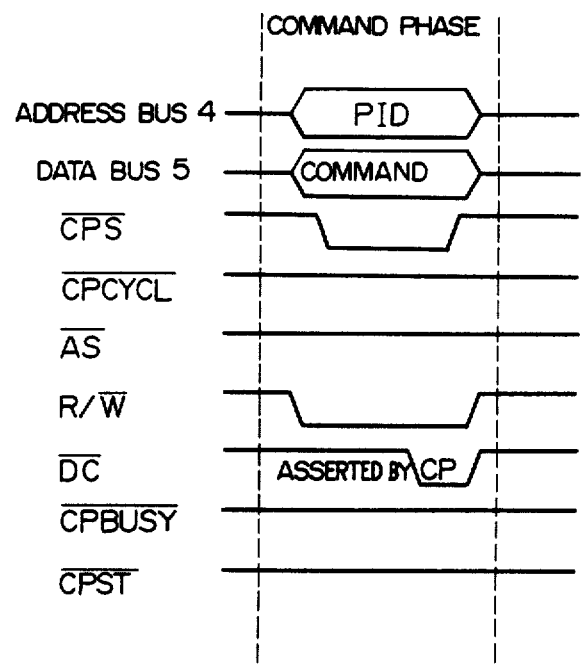
FIG. 18 is a timing chart of execution of the coprocessor conditional branch instruction.
Figure 19:
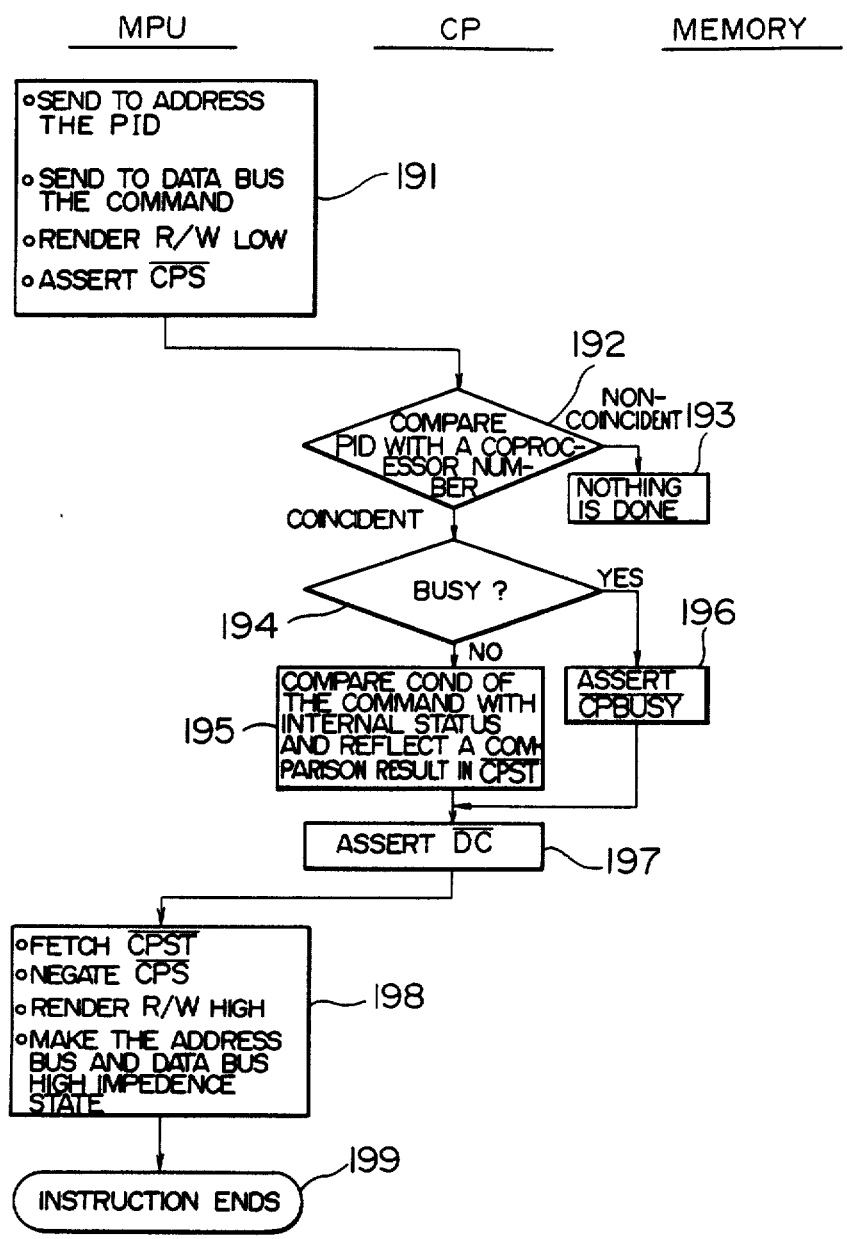
FIG. 19 is a flow chart for the FIG. 18 timing chart.

Referring to FIG. 18, there is illustrated a bus operation during execution of the conditional branch instruction. A flow chart corresponding to this bus operation is illustrated in FIG. 19. When detecting the instruction of the FIG. 8 format, the MPU effects sending of the PID onto the address bus, delivery of the command - shown in FIG. 9 indicating of the conditional branch instruction onto the data bus and rendering the R/$\overline{\text{W}}$ low as well as assertion of the $\overline{\text{CPS}}$ for indicating that the command phase is in order (step 191). The CP compares a coprocessor number of its own with the identification PID on the address bus (step 192). If non-coincident, nothing is executed (step 193). If the comparison result indicates that the CP is selected, the CP, if not busy (step 194), compares the condition COND in the command on the data bus with its internal state to reflect a comparison result in the $\overline{\text{CPST}}$ and then asserts the $\overline{\text{DC}}$ (steps 195 and 197). If busy, the CP continues to assert the $\overline{\text{CPBUSY}}$ and then asserts the $\overline{\text{DC}}$ (steps 196 and 197). When detecting assertion of the $\overline{\text{DC}}$ by the CP, the MPU makes the data bus high impedance state (step 198) and ends the instruction (step 199).

In the flow chart of FIG. 19, input/output control for the MPU is implemented by means of the input/output circuit of FIG. 13. During the execution phase, the MPU cooperates with an on-chip, falling-edge-sense type latch circuit 130 as shown in FIG. 20 to latch a value of the $\overline{\text{CPST}}$ at the timing for the $\overline{\text{DC}}$ to be asserted.

In the flow chart of FIG. 19, input/output control for the CP is implemented by means of the input/output circuit of FIG. 14. For the conditional branch instruction, the condition is decided during the same bus cycle as that for writing command. The operation of command write is identical with command phase p 1 of FIG. 10 described previously. With the conditional branch instruction, the CP, in accordance with its microprogram, detects that the command suggestive of the conditional decision instruction is decoded, receives the condition COND in the command at an input bus 155 to the operation unit 154 and at an input bus 156 thereto, an output signal from a register (not shown) indicative of an internal state of the CP, for which the status register of the CP, for example, may be utilized, causes the operation unit 154 to compare the input signals and asserts the EXEC. After the comparison operation is finished, an operation result is supplied to the state machine 142 and the CP microprogram negates the EXEC so that the state machine 142 reflects the operation results in the $\overline{\text{CPST}}$ and negates the DC, ending the bus cycle.

A second embodiment of the invention will now be described. In the second embodiment, the operation field of the coprocessor instruction is made wider than in the previous embodiment and the external pins of the microprocessor are used efficiently.

In the second embodiment, an MPU 1, a CP 2, a memory 3, an address bus 4 and a data bus 5 are interconnected as exemplified in FIG. 21. Referring to FIG. 21, signals delivered out of the MPU 1 and received by the CP 2 include the same signals as those of the first embodiment including address signal A4-2, data signal D31-0, address strobe signal $\overline{\text{AS}}$ and read/write signal R/$\overline{\text{W}}$, signals not used in the first embodiment including byte control signal $\overline{\text{BC0}}$/ synchronous memory cycle signal $\overline{\text{SMC}}$, data strobe signal $\overline{\text{DS}}$ and coprocessor data enable signal $\overline{\text{CDE}}$, and access type signal AT2-0 substituting for the $\overline{\text{CPS}}$ and $\overline{\text{CPCYCL}}$ in the first embodiment. Functions of the access type signal AT2-0 will be described later.

Signals delivered out of the MPU 1 and received by the memory 3 include the same signals as those of the first embodiment including address signal A31-2, data signal D31-0, address strobe signal $\overline{\text{AS}}$ and read/write signal R/$\overline{\text{W}}$, and signals not used in the first embodiment including byte control signal $\overline{\text{BC0}}$/ , synchronous memory cycle signal $\overline{\text{SMC}}$, data strobe signal $\overline{\text{DS}}$ and access type signal AT2-0.

Signals sent from the coprocessor 2 and received by the MPU 1 include data transfer complete signal $\overline{\text{DC}}$ like the first embodiment, bus status signal BST unlike the first embodiment, and coprocessor status signal CPST 2-0 substituting for the $\overline{\text{CPST}}$ and $\overline{\text{CPBUSY}}$ in the first embodiment. Functions of the coprocessor status signal CPST 2-0 will be described later.

A signal sent from the CP 2 to the memory 3 is data signal D31-0, like the first embodiment.

Signals sent from the memory 3 and received by the MPU 1 include, like the first embodiment, data signal D31-0 and data transfer complete signal $\overline{\text{DC}}$ as well as, unlike the first embodiment, bus status signal BST.

Signals delivered out of the memory 3 and received by the CP 2 include, like the first embodiment, data signal D31-0 and data transfer complete signal $\overline{\text{DC}}$ as well as, unlike the first embodiment, bus status signal BST.

Listed in Table 2 are the signals not used in the first embodiment but newly added in the second embodiment wherein the MPU and the CP cooperate for processing. These signals will be specifically clarified as a description of this embodiment proceeds.

TABLE 2

| Abb. of Signal | Name of Signal/ Description of Signal |
|---|---|
| $\overline{\text{BC0-3}}$ | Byte Control 0-3 constitutes part of an address and indicates a byte location. |
| $\overline{\text{SMC}}$ | Synchronous Memory Cycle indicates that the bus cycle is in a synchronous transfer cycle which ends independently of assertion of the $\overline{\text{DC}}$. |
| $\overline{\text{DS}}$ | Data Strobe indicates that data on the data bus is valid. |
| AT2-0 | Access Type 2-0 indicates the kind of bus cycle. |
| $\overline{\text{CDE}}$ | Coprocessor Data Enable instructs the CP to start the bus cycle. |
| BST | Bus Status indicates whether the bus cycle comes to a normal end. |
| CPST2-0 | Coprocessor Status informs the MPU of the CP status. |

An example of encoding the AT2-0 is shown in Table 3.

TABLE 3

| AT2-0 | Memory | CP |
|---|---|---|
| 000 | Data | |
| 001 | Program | |
| 010 | IACK/PACK* | |

TABLE 3-continued

| AT2-0 | Memory | CP |
|---|---|---|
| 011 | CR SPACE | CR SPACE |
| 100 | Data | Data |
| 101 | | Inst. ADR |
| 110 | | Command |
| 111 | | MPU - CP |

*IACK/PACK may be changed to be a part of CR space.

Especially, the AT2 (most significant bit) indicates whether the bus cycle is related to the CP. For AT2=0, the bus cycle is unrelated to the CP and for AT2=1, related to the CP. The memory is read for data transfer when R/$\overline{W}$=1 and written when R/$\overline{W}$=0. The AT2-0 being "000" indicates the data transfer cycle between MPU and memory.

The AT2-0 being "001" indicates the program fetch, the AT2-0 being "010" indicates the interruption acknowledge cycle (IACK) or the purge acknowledge cycle (PACK), and the AT2-0 being "011" indicates the control space (CR space) access.

The AT2-0 being "100" indicates the data transfer cycle between CP and memory, the AT2-0 being "101" indicates the instruction address tansfer bus cycle from MPU to CP, the AT2-0 being "110" indicates the command transfer bus cycle from MPU to CP, and the AT2-0 being "111" indicates the data transfer cycle between MPU and CP.

The first embodiment requires at least two lines for control signals in order to distinguish the data, program, IACK/PACK and control space from each other. Further, the $\overline{CPS}$ and $\overline{CPCYCL}$ signals are added, the number of lines amounting to four in total. On the other hand, the second embodiment is satisfied with three lines for the AT2-0. This means that the second embodiment uses the external pins more efficiently than the first embodiment. An example of encoding the CPST2-0 is shown in Table 4

TABLE 4

| CPST2-0 | CP state |
|---|---|
| 000 | Reserved |
| 001 | Busy |
| 010 | Command acceptance or Condition is true |
| 011 | Data Transfer Ready or Condition is false |
| 100 | Reserved |
| 101 | Coprocessor command error |
| 110 | Coprocessor exception |
| 111 | Coprocessor non-connected exception |

The CPST2-0 being either of "000" and "100" is reserved and remains unused in this embodiment. The CPST2-0 being "001" indicates that the CP is busy, implying that the issued command has not been accepted. The MPU has to reissue the command. The CPST2-0 being "010" indicates that a condition is satisfied for the conditional examination command and acceptance is acknowledged for the other commands. The CPST2-0 being "011" indicates that a condition is not satisfied for the conditional examination command and for the other commands, the data transfer from the CP is requested. The CPST2-0 being "101" indicates that the command being transferred during the current bus cycle is impossible for the CP to execute. The CPST2-0 being "110" indicates the occurrence of exceptional condition such as overflow. The CPST2-0 being "111" indicates that the CP is disconnected.

While the first embodiment uses two lines for the $\overline{CPST}$ and $\overline{CPBUSY}$ signals to indicate two statuses of the CP, the second embodiment uses three lines for the CPST2-0 signal to indicate eight statuses of the CP. This means that the second embodiment uses the external pins more efficiently than the first embodiment.

Figures 22, 23:
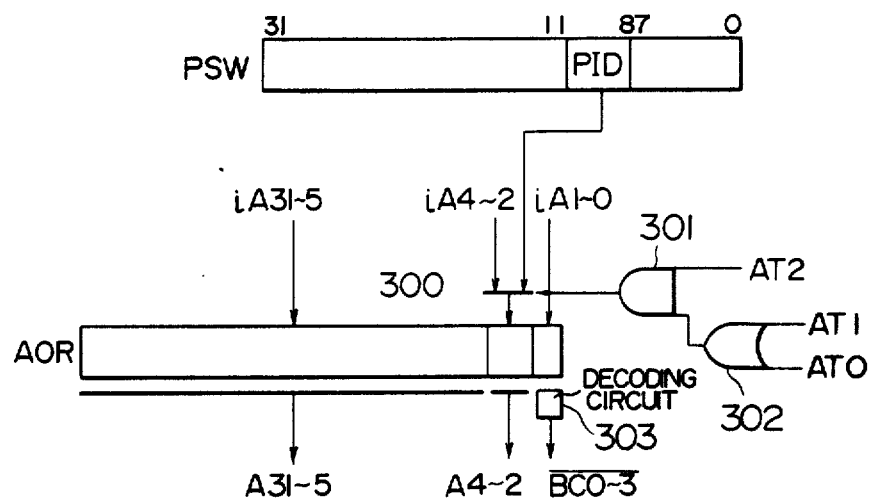
FIG. 22 illustrates an example of format of a command from MPU to FPU.
FIG. 23 is a diagram illustrating an example of method for designating FPU number by using a register.

An example of the coprocessor instruction format is illustrated in FIG. 22. Being different from the FIG. 2 instruction format of the first embodiment, the format exemplified herein does not contain the coprocessor identification PID and a field otherwise used therefor is of operation OP, ensuring that the number of CP instructions can be increased as compared to the first embodiment. However, to realize a multi-coprocessor system, the PID must be designated in a different way. For example, the PID can be designated using a processor status word (PSW) as shown in FIG. 23. The PSW is of a 32-bit length register and in an example of FIG. 23, the PID is stored in bits 10 to 8 and the processor status such as operation flag is stored in bits 31 to 11 and bits 7 to 0.

A 32-bit address computed by the MPU is represented by iA31-5, iA4-2 and iA1-0. The iA31-5 is delivered as an external signal A31-5 through an address output register (AOR).

One of the iA4-2 and PID is selected by a selector 300 and delivered as an external signal A4-2 through the AOR. The PID is delivered as the signal A4-2 under conditions of (1) the CP instruction address transfer cycle (AT2-0 =101), (2) the command transfer cycle to the CP (AT2-0 =110) and (3) the data transfer cycle between MPU and CP (AT2-0=111). Only when any of the above three conditions is satisfied, an AND gate 301 and an OR gate 302 cooperate to render the output of AND gate 301 high, enabling the selector 300 to select the PID. Excepting the three conditions, the output of AND gate 301 is rendered low to enable the selector 300 to select the iA4-2.

The iA1-0 is delivered as the $\overline{BC0}$/ through the AOR and a decoding circuit 303.

In this manner, the PID is once stored in a specified register of the MPU and then selected for delivery as the A4-2 in accordance with the value of the AT2-0.

Figure 24:
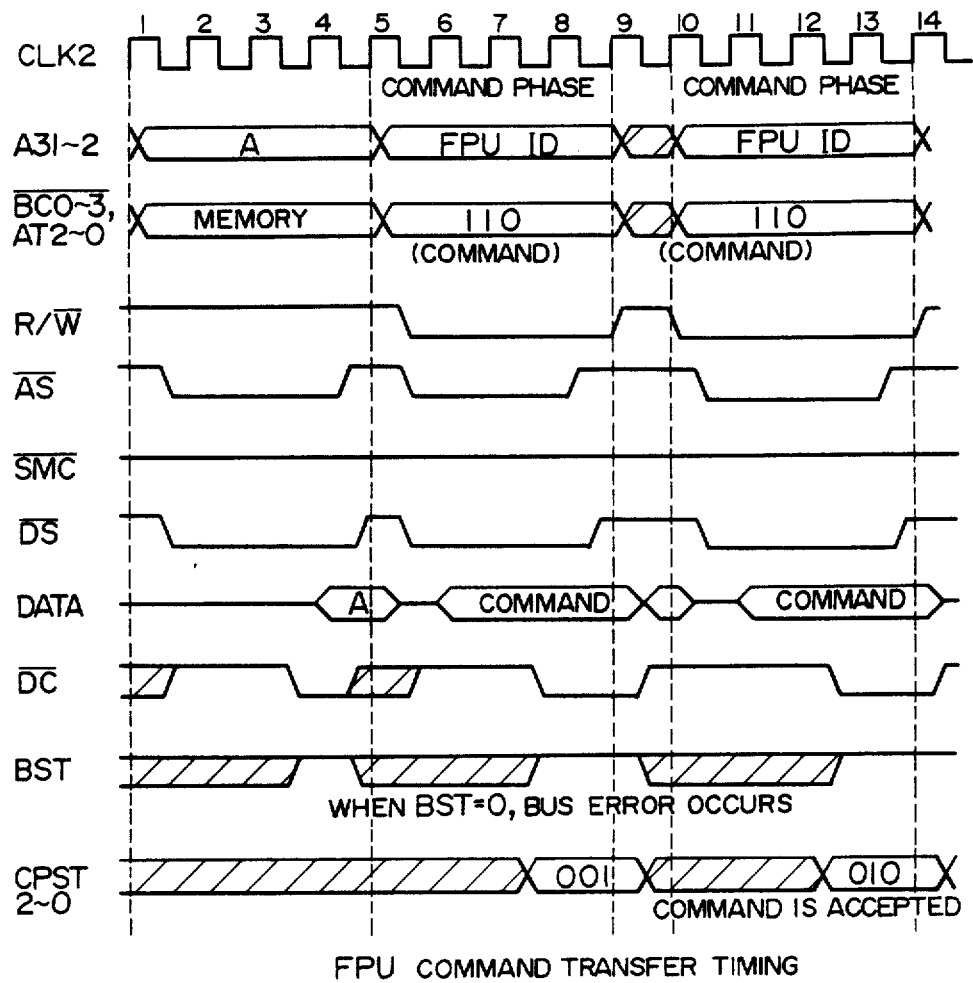
FIG. 24 is a timing chart of a command phase.

FIG. 24 illustrates an example of a timing chart of the command phase. The command phase is for selecting a predetermined FPU and supplying an execution command to the FPU and it is executed in accordance with a flow chart shown in FIG. 25. Referring to FIG. 25, the MPU delivers the coprocessor identification PID representative of the FPU onto the address bus and the command for the FPU onto the data bus, renders the AT2-0 "110" to indicate the command phase in order, renders the R/$\overline{W}$ signal low and thereafter asserts the $\overline{AS}$ (step 251). The MPU then waits for the $\overline{DC}$ being asserted by the FPU. After assertion of the $\overline{DC}$ by the FPU, the MPU changes the address bus, $\overline{AS}$ and R/$\overline{W}$ as shown in FIG. 24. When receiving "110" of the AT2-0 and the low level $\overline{AS}$, the FPU compares an identification of its own with the PID on the address bus (step 252). If coincident, the FPU knows that it is selected, reflects "command acceptance" or "busy" in accordance with the value of CPST2-0 in Table 4, fetches the command, and asserts the $\overline{DC}$ (step 254). If non-coincident, nothing is done (step 253). The MPU, when detecting the assertion of $\overline{DC}$ by the FPU, makes the data bus high impedance state and negates the $\overline{AS}$ (step 255), ending the command phase (step 256).

In the example of FIG. 24, the FPU returns "001" of the CPST2-0 during the command phase ranging from clock 5 to clock 8, indicating that the FPU is busy. Consequently, the command is not accepted and the command phase is restarted during clock 10 to clock 13. During the command phase over clocks 10 to 13, the CPST2-0 is rendered "010", indicating that the command is accepted.

Figure 26:
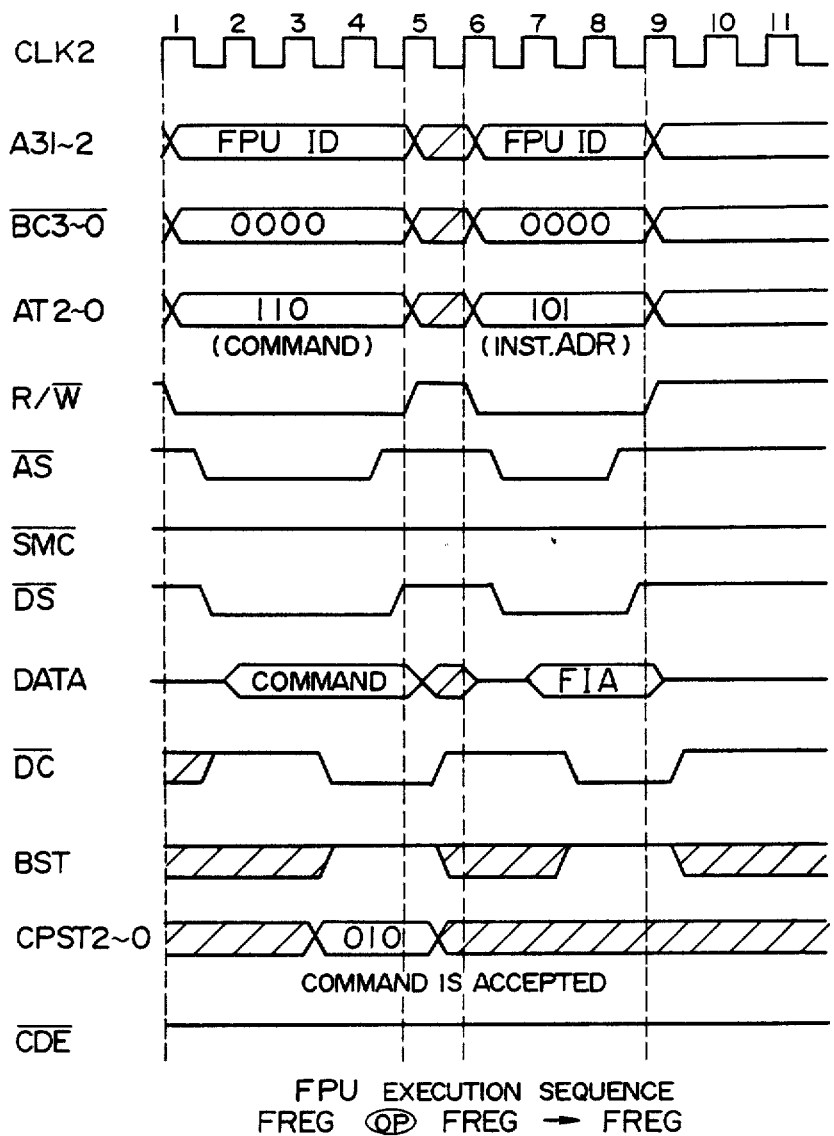
FIG. 26 is a timing chart of operations between FPU registers.

FIG. 26 illustrates an example of a timing chart of an operation between registers of the FPU. In the operation between the FPU registers, a bus cycle designated by "101" of the AT2-0 is inserted immediately after the command transfer in order to transfer the address FiA of the FPU instruction to the FPU. In the case of the operation between FPU registers, the MPU will not wait for completion of the operation but will execute the program. Therefore, the MPU transfers the FiA to the FPU and is used for analysis when overflow takes place in the FPU.

Figure 27:
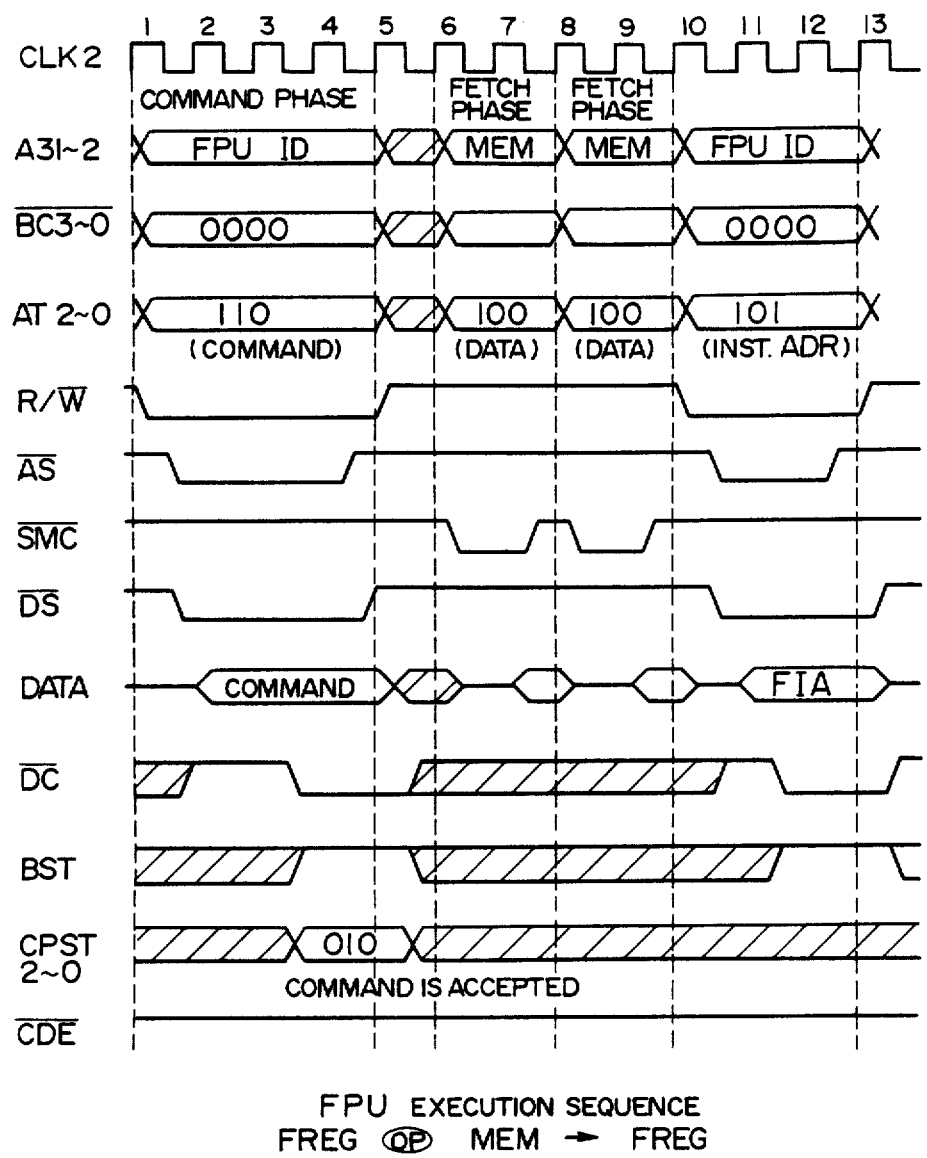
FIG. 27 is a timing chart of operations between FPU register and memory.

The FPU register and the content of the memory are operated and operation results are stored in the FPU register in accordance with a timing chart as exemplified in FIG. 27. This example needs the fetch phase of operand.

The fetch phase is for fetching data necessary for the CP from the memory. FIG. 28 illustrates an example of a flow chart of the fetch phase. The MPU sends an operand address onto the address bus, renders the R/$\overline{W}$ signal high, renders the AT2-0 "100", asserts the $\overline{AS}$ or $\overline{SMC}$, thus informing the FPU that the data transfer cycle is in order, and waits for the $\overline{DC}$ signal being asserted by the memory (step 281).

As shown in FIG. 27, the address bus and the $\overline{AS}$ are changed after the $\overline{DC}$ has been asserted. The $\overline{SMC}$ is negated independently of the $\overline{DC}$ signal.

As in the case of the conventional microcomputer system, the memory delivers the memory contents designated by the address bus and asserts the $\overline{DC}$ signal (step 282). When detecting assertion of the $\overline{DC}$ signal by the memory, the FPU fetches data on the data bus (step 284). The MPU, when detecting the low level of the $\overline{DC}$ signal, negates the $\overline{AS}$ (step 283) and ends the operand fetch cycle (step 285)

Where 64-bit floating point data are transferred from memory to FPU by using the 32-bit bus, the fetch phase repeats itself twice as shown in FIG. 27 in accordance with the MPU microprogram. In this case, the sequence of FIG. 28 is repeated twice.

After receiving the necessary operand, the FPU performs operations such as arithmetic operation and fundamental function operation. This phase is termed the execution phase. The FPU continues to hold "001" of the CPST2-0 and remains busy until a predetermined operation is finished, rejecting acceptance of the next command.

After completion of the fetch phase, the MPU will not wait for completion of operation by the FPU but will execute the program. Accordingly, the FiA must be transferred to the FPU.

Figure 29:
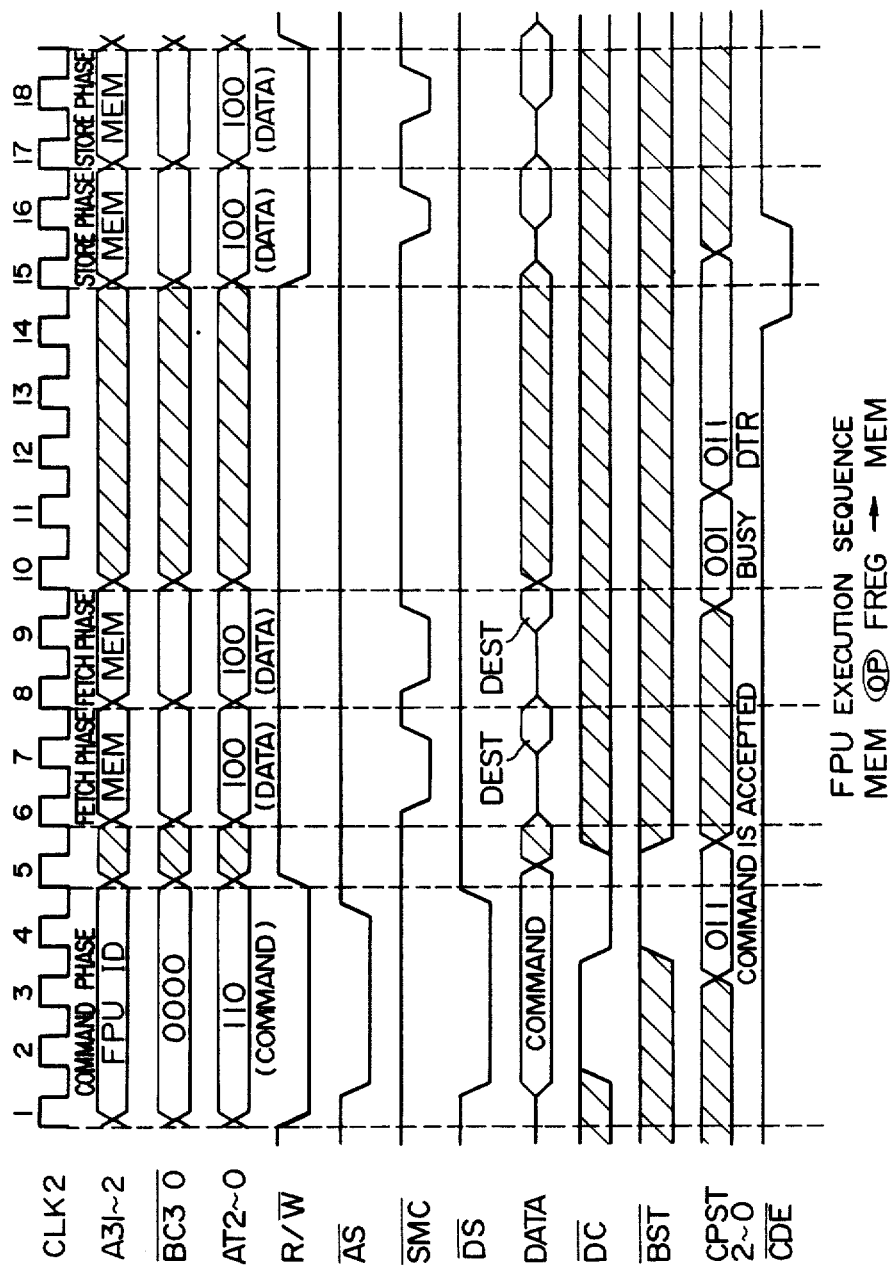
FIG. 29 is a timing chart of operations between memory and FPU registers.

The content of the memory and the FPU register are operated and operation results are stored in the memory in accordance with a timing chart as exemplified in FIG. 29. The example needs the store phase of operand, in addition to the command phase and the fetch phase of operand.

The destination is, in this case, the memory and accordingly the MPU will wait for completion of operation by the FPU and transfer of the FiA will not carried out. As the CPST2-0 signal changes from "001" indicative of "busy" to "011" indicative of "data transfer ready", the FPU detects that the operation is finished and it enters into the store phase of operand.

During the store phase, in order to expedite the FPU to deliver data, the MPU instructs the FPU by asserting the CDE signal and then the $\overline{AS}$ or the $\overline{SMC}$ is asserted.

Figure 30:
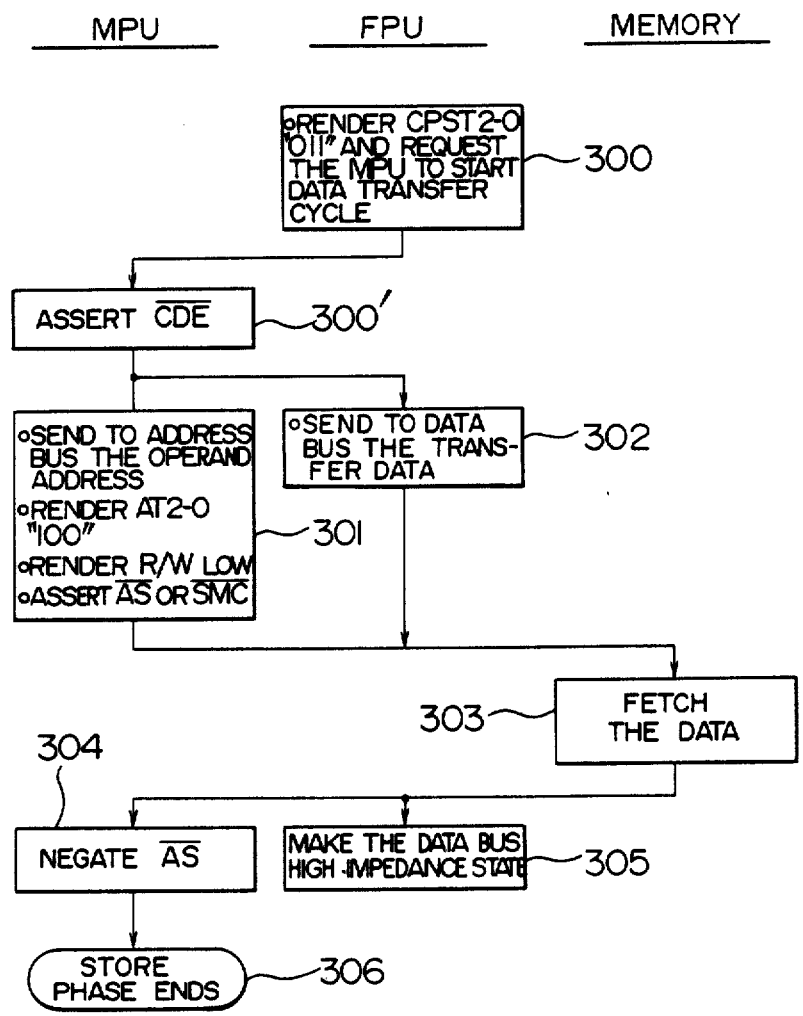
FIG. 30 is a flow chart of a store phase.

FIG. 30 illustrates an example of a flow chart of the fetch phase. When the operation ends, the FPU renders the CPST2-0 "011" to request the MPU to start the data transfer cycle (step 300). The MPU detects the CPST2-0 being "011" in accordance with its internal microprogram and then asserts the CDE (step 300'). Beginning with the next clock cycle, the MPU starts the memory write cycle while keeping the data bus at high impedance state. More specifically, the MPU sends an operand address onto the address bus, renders the AT2-0 "100" and the R/$\overline{W}$ low, and asserts the $\overline{AS}$ or the $\overline{SMC}$ (step 301). On the other hand, the FPU, when detecting assertion of the $\overline{SMC}$ by the MPU, delivers data onto the data bus (step 302). Concurrently with starting the bus cycle, the $\overline{CDE}$ permits the data to be delivered to the data bus.

The assertion of the $\overline{AS}$ or $\overline{SMC}$ by the MPU enables the memory to write the data in the conventional manner and the memory asserts the $\overline{DC}$ (step 303). Upon assertion of the $\overline{DC}$ by the memory, the MPU negates the $\overline{AS}$ (step 304), the FPU makes the data bus high impedance state (step 305) and the store phase ends (step 306). The $\overline{SMC}$ is negated irrespective of the $\overline{DC}$.

Figure 31:
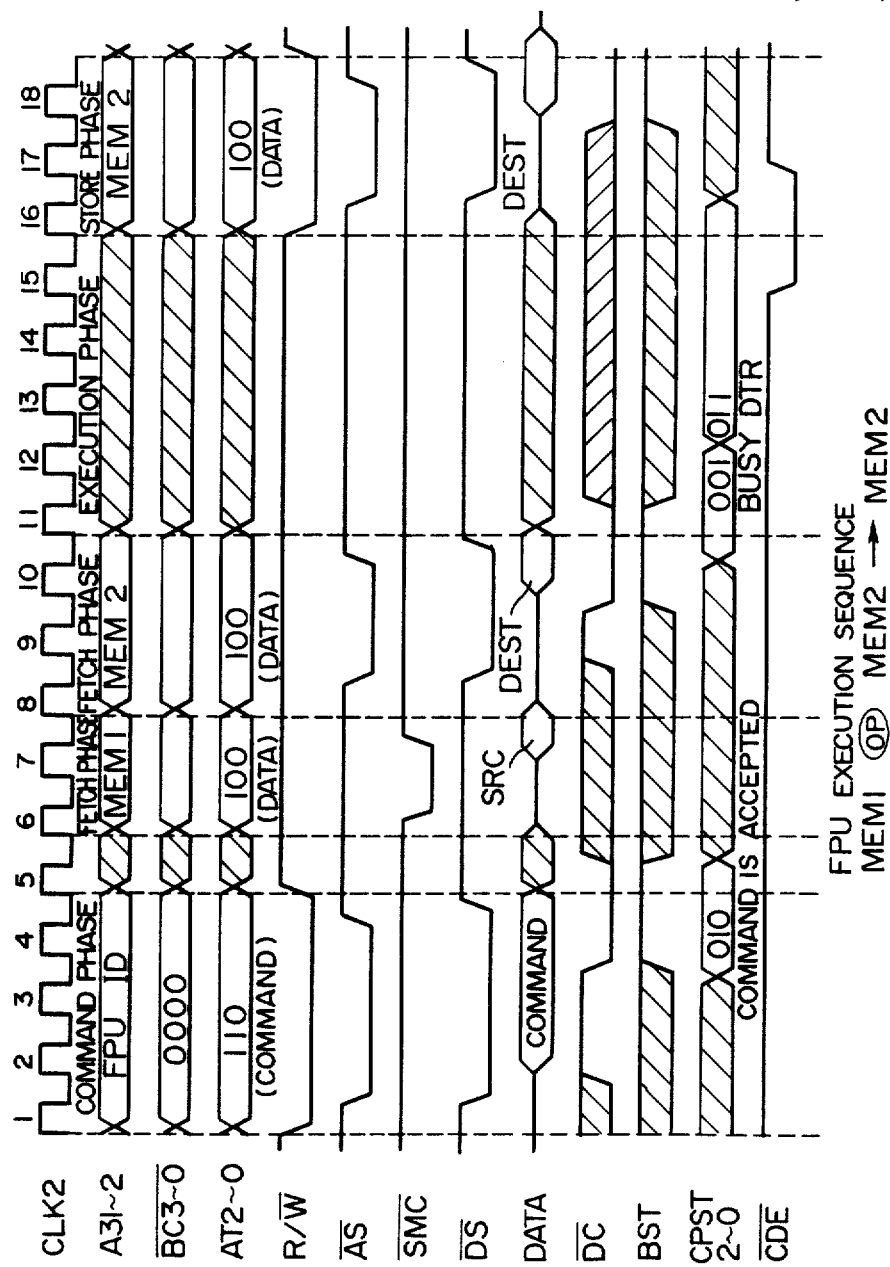
FIG. 31 is a timing chart of operations between memories.

The memory and the content thereof are operated and operation results are stored in the memory in accordance with a timing chart as exemplified in FIG. 31. At clocks 6 and 7, first contents of the memory is transferred to the FPU and at clocks 8 to 10, second contents of the memory is transferred to the FPU. At clocks 16 to 18, operation results are stored in the memory. The command phase, fetch phase and store phase are respectively carried out in accordance with the same flow charts as those of FIGS. 25, 28 and 30.

FIG. 32 illustrates an example of a timing chart of the conditional branch instruction. In the conditional branch instruction in the first embodiment as explained with reference to FIGS. 18 and 19, whether a condition is satisfied or unsatisfied is indicated by either the high level or low level of the CPST signal. In FIG. 32, however, "010" of the CPST2-0 indicates that a condition is satisfied and "011" of the CPST2-0 indicates that the condition is unsatisfied.

As has been described thus far, according to the invention, the data transfer between memory and CP can be implemented within one bus cycle. More particularly, the $\overline{CPS}$ and $\overline{CPCYCL}$ signals or the AT2-0 signal is added to the memory access signal used in the conventional microprocessor and the $\overline{CPS}$ and $\overline{CPCYCL}$ signals or the AT2-0 signal can be used to select the CP simultaneously with accessing the memory, thus ensuring the data transfer between memory and CP within one bus cycle. The wait bit W in the status register of the MPU or in the instruction can be used to selectively execute the next instruction after issuance of the operation complete signal from the CP or before the issuance. The CP can issue the signal indicative of whether a condition of the conditional branch instruction is satisfied to keep the MPU informed immediately by this signal.

Accordingly, a data processing system with a less overhead MPU/CP interface can be realized.

We claim:

1. A data processing system comprising:
   a first processor;
   a second processor;
   a memory;
   an address bus interconnecting said first processor, said second processor and said memory;
   a data bus interconnecting said first processor, said second processor and said memory;
   a first signal line interconnecting said first processor and said second processor;
   wherein said first processor fetches an instruction to be processed by said second processor;
   wherein a command which corresponds to said instruction is sent to said second processor by said first processor over said data bus,
   wherein instructions fetched by said first processor include a conditional branch instruction whose branch depends on whether a condition for branch is satisfied in said second processor,
   wherein within one bus cycle said first processor sends a conditional branch command which corresponds to said conditional branch instruction to said second processor over said data bus,
   and wherein within said one bus cycle said second processor sends a first signal to said first processor over said first signal line indicative of whether said condition for branch is satisfied.

2. A data processing system according to claim 1, further comprising:
   a second signal line interconnecting said first processor and said second processor;
   wherein within a next consecutive bus cycle after said one bus cycle said first processor sends an address signal over said address bus to said memory and sends a second signal over said second signal line to said second processor, said second signal indicating that said other bus cycle is for transferring data between said second processor said memory,
   and wherein data is transferred between said second processor and said memory over said data bus within said other bus cycle.

3. A microprocessor for use in a data processor system, said data processing system including an address bus connected to said microprocessor, a data bus connected to said microprocessor, a memory connected to said address bus and said data bus, a coprocessor connected to said address bus and said data bus, a first signal line connected to said microprocessor and said coprocessor and a second signal line connected to said microprocessor and said coprocessor, wherein said microprocessor fetches an instruction to be processed by said coprocessor, wherein a command which corresponds to said instruction sent to said coprocessor by said microprocessor over said data bus, wherein instructions fetched by said microprocessor includes a conditional branch instruction whose branch depends on whether a condition for branch is satisfied in said Coprocessor wherein within one bus cycle said microprocessor sends a conditional branch command which corresponds to said conditional branch instruction to said coprocessor over said data bus, and wherein within said bus cycle said coprocessor sends a first signal to said microprocessor over said first signal line, indicative of whether said condition for branch is satisfied,
   said microprocessor comprising:
   first means for receiving said first signal from said first signal line; and
   second means for sending an address signal over said address bus to said memory and for sending a second signal over said second signal line to said coprocessor within another bus cycle, said second signal indicating that said other bus cycle is for transferring data between said coprocessor and said memory, whereby data is transferred between said coprocessor and said memory within said other bus cycle.

* * * * *